United States Patent
Sarraf et al.

(10) Patent No.: US 12,486,287 B2
(45) Date of Patent: Dec. 2, 2025

(54) SOLID FORMS OF A PROMOTER OF SPINOGENESIS

(71) Applicant: Spinogenix, Inc., San Diego, CA (US)

(72) Inventors: Stella T. Sarraf, Beverly Hills, CA (US); Elizabeth Büchler Vadas, Dorval (CA)

(73) Assignee: Spinogenix, Inc., Los Angeles, CA (US)

( * ) Notice: Subject to any disclaimer, the term of this patent is extended or adjusted under 35 U.S.C. 154(b) by 1050 days.

(21) Appl. No.: 17/426,882

(22) PCT Filed: Jan. 30, 2020

(86) PCT No.: PCT/US2020/015967
§ 371 (c)(1),
(2) Date: Jul. 29, 2021

(87) PCT Pub. No.: WO2020/160332
PCT Pub. Date: Aug. 6, 2020

(65) Prior Publication Data
US 2022/0106330 A1    Apr. 7, 2022

Related U.S. Application Data

(60) Provisional application No. 62/799,644, filed on Jan. 31, 2019.

(51) Int. Cl.
*C07D 513/04*    (2006.01)
*A61K 31/428*    (2006.01)
(Continued)

(52) U.S. Cl.
CPC .......... *C07D 513/04* (2013.01); *A61K 31/428* (2013.01); *C07D 277/66* (2013.01);
(Continued)

(58) Field of Classification Search
CPC .......................... C07D 277/66; A61K 31/428; C07B 2200/13; A61P 25/28; A61P 25/00
See application file for complete search history.

(56) References Cited

U.S. PATENT DOCUMENTS

| 6,576,654 B1 | 6/2003 | Macias |
| 7,666,886 B2 | 2/2010 | Yang et al. |

(Continued)

FOREIGN PATENT DOCUMENTS

| CN | 101102796 A | 1/2008 |
| CN | 103554482 A | 2/2014 |

(Continued)

OTHER PUBLICATIONS

Brittain, H. G..; "Chapter 6: Methods for the Characterization of Polymorphs and Solvates"; in Polymorphism in Pharmaceutical Solids; EBSCO Publishing, 1999, pp. 227-278 (Year: 1999).*

(Continued)

*Primary Examiner* — Timothy P Thomas
(74) *Attorney, Agent, or Firm* — Sheppard Mullin Richter & Hampton LLP

(57) ABSTRACT

Provided herein are crystalline forms of 2-(2-(2-(2-(4-(benzo[d]thiazol-2-yl)phenoxy)ethoxy)ethoxy)ethoxy) ethan-1-ol (Compound I): Also provided are processes of manufacture and methods of using the crystalline forms.

(Compound I)

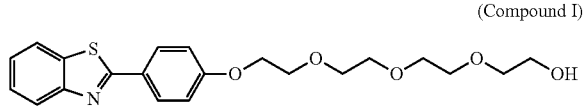

4 Claims, 17 Drawing Sheets

(51) Int. Cl.
  *A61P 25/00* (2006.01)
  *A61P 25/28* (2006.01)
  *C07D 277/66* (2006.01)
(52) U.S. Cl.
  CPC .............. *A61P 25/00* (2018.01); *A61P 25/28* (2018.01); *C07B 2200/13* (2013.01)

(56) References Cited

U.S. PATENT DOCUMENTS

| | | | |
|---|---|---|---|
| 8,741,883 | B2 | 6/2014 | Yang et al. |
| 10,675,273 | B2 | 6/2020 | Yang |
| 2009/0028787 | A1 | 1/2009 | Gravenfors et al. |
| 2012/0253047 | A1 | 10/2012 | Allegrini et al. |
| 2014/0080843 | A1 | 3/2014 | Huang et al. |
| 2015/0299191 | A1 | 10/2015 | Huang et al. |
| 2015/0366776 | A1 | 12/2015 | Chung et al. |
| 2019/0000811 | A1 | 1/2019 | Yang |

FOREIGN PATENT DOCUMENTS

| | | | | |
|---|---|---|---|---|
| WO | 2002016333 | A2 | 2/2002 | |
| WO | WO 2014/134287 | | 9/2014 | |
| WO | WO 2017/120198 | | 7/2017 | |
| WO | WO 2019/005682 | | 1/2019 | |
| WO | WO-2019028164 | A1 * | 2/2019 | ........... C07D 277/66 |
| WO | WO 2020/046991 | | 3/2020 | |
| WO | WO 2020/160332 | | 8/2020 | |

OTHER PUBLICATIONS

International Search Report & Written Opinion dated Apr. 1, 2020 for PCT/US2020/015967. 21 pages.
Kazemi, et al. A mild and efficient procedure for the synthesis of ethers from various alkyl halides. Iran. Chem. Commun. 1 (2013) 43-50.
PubChem CID 13456094. 2-(2-(2-(2-Hydroxyethoxy)ethoxy)ethoxy)ethyl 4-methylbenzenesulfonate. Feb. 8, 2007. 12 pages.
PubChem CID 19609441. 2-(4'-Heptyloxyphenyl)benzothiazole. Dec. 5, 2007. 8 pages.
Ciapetti, et al. Molecular Variations Based on Isosteric Replacements. The Practice of Medicinal Chemistry. Elsevier, Amsterdam, NL. Jan. 1, 2008; Chapter 8: pp. 181-241.
Cifelli, et al. Benzothiazole Amphiphiles Ameliorate Amyloid β-Related Cell Toxicity and Oxidative Stress. ACS Chem. Neurosci. 2016, 7, 6, 682-688.
Cifelli, et al. Benzothiazole Amphiphiles Promote the Formation of Dendritic of dendritic spines in primary hippocampal neurons. Journal of Biological Chemistry. Jun. 3, 2016; 291(23):11981-11992.
Extended European Search Report and Search Opinion dated Mar. 31, 2021 for EP Application No. 18840208.5. 12 pages.
Extended European Search Report and Search Opinion dated Sep. 27, 2022 for EP Application No. 20747738.1. 7 pages.

Habib, L.K. et al. (Dec. 10, 2010, e-published Oct. 5, 2010). "Inhibitors of catalase-amyloid interactions protect cells from beta-amyloid-induced oxidative stress and toxicity," J Biol Chem 285(50):38933-38943.
Huang, et al. Inhibition of cholinesterase activity and amyloid aggregation by berberine-phenyl-benzoheterocyclic and tacrine-phenylbenzoheterocyclic hybrids. Bioorganic & Medicinal Chemistry. May 1, 2012; 20(3):3038-3048.
Inbar, P. et al. (Oct. 2006). "Oligo(ethylene glycol) derivatives of thioflavin T as inhibitors of protein-amyloid interactions," ChemBioChem 7(10):1563-1566.
International Search Report and Written Opinion dated Mar. 30, 2017 for PCT Application No. PCT/US2017/012139, 12 pages.
International Search Report and Written Opinion dated Sep. 12, 2018 for PCT Application No. PCT/US2018/044852, 9 pages.
Lee, N.J. et al. (Feb. 2016, e-published Dec. 8, 2015). "Hexa (ethylene glycol) derivative of benzothiazole aniline promotes dendritic spine formation through the RasGRF1-Ras dependent pathway," Biochim Biophys Acta 1862(2):284-295.
Mahou, et al. Versatile Route to Synthesize Heterobifunctional Poly(ethylene glycol) of Variable Functionality for Subsequent Pegylation. Polymers 2012, 4, 561-589.
Megill, A. et al. (May 29, 2013). "A tetra(ethylene glycol) derivative of benzothiazole aniline enhances Ras-mediated spinogenesis," J Neurosci 33(22):9306-9318.
Prangkio, P. et al. (Dec. 2011, e-published Aug. 26, 2011). "Self-assembled, cation-selective ion channels from an oligo(ethylene glycol) derivative of benzothiazole aniline," Biochim Biophys Acta 1808(12):2877-2885.
Prangkio, P. et al. (2012, e-published Oct. 15, 2012). "Multivariate analyses of amyloid-beta oligomer populations indicate a connection between pore formation and cytotoxicity," PLoS One 7(1O):e47261.
Song, J.M. et al. (Feb. 2014, e-published Dec. 6, 2013). "A tetra(ethylene glycol) derivative of benzothiazole aniline ameliorates dendritic spine density and cognitive function in a mouse model of Alzheimer's disease," Exp Neural 252:105-113.
Supplementary European Search Report and Search Opinion dated Jul. 19, 2019 for EP Application No. 17736233.2. 7 pages.
Wu, et al. Triethylene glycol-modified iridium(iii) complexes for fluorescence imaging of Schistosoma japonicum. Journal of Materials Chemistry. Jan. 1, 2017; 5(25):4973-4980.
Wu, et al. Supporting Information—Triethylene glycol-modified iridium(iii) complexes for fluorescence imaging of Schistosoma japonicum. Journal of Materials Chemistry. Jan. 1, 2017; pp. 1-3.
Xing, et al. Generation of halogenated hydrocarbons. Organic Chemistry. Shandong University Press. 2001. 4 pages. (In Chinese with Machine translation).
Yang, J. et al. (Jul. 26, 2002). "Catalytic oxidations of steroid substrates by artificial cytochrome p-450 enzymes," J Org Chem 67(15):5057-5067.
Zhao, X. et al. (Oct. 20, 2010). "Amyloid-β peptide is a substrate of the human 20S proteasome," ACS Chem Neurosci 1(10):655-660.
Nozaki et al., "Medicinal Chemistry," 1995, first edition, pp. 98-99, published by Kagaku-Dojin Publishing Company.
Wermuth, "The Practice of Medicinal Chemistry," 1998, Chapter 13: Conversion of molecules based on equivalent replacement, pp. 235-271, published by Technomics, Inc.

* cited by examiner

SOLID FORMS OF A PROMOTER OF SPINOGENESIS

CROSS-REFERENCE TO RELATED APPLICATIONS

This application is a U.S. National Stage Application under 35 U.S.C. § 371 of International Application No. PCT/US2020/015967, filed Jan. 30, 2020, which claims the benefit under 35 U.S.C. § 119 (e) of U.S. Provisional Application No. 62/799,644, filed Jan. 31, 2019, which is hereby incorporated by reference in its entirety.

FIELD

The present disclosure relates generally to crystalline forms of the compound 2-(2-(2-(2-(4-(benzo[d]thiazol-2-yl)phenoxy)ethoxy)ethoxy)ethoxy)ethan-1-ol, designated herein as Compound I, pharmaceutical compositions thereof, their therapeutic use, and processes for making the forms.

BACKGROUND

Neuronal disorders are diseases of the brain, spinal cord and peripheral nervous system. The greatest societal costs, in terms of epidemiology and individual morbidity, are imposed by neurodegenerative conditions, which result in the damage or loss of neurons and the synaptic connections between them. Among the most prominent of these are Alzheimer's disease and Parkinson's disease. Other neurodegenerative conditions include age-related conditions (e.g. Parkinson's dementia, vascular dementia, Amyotrophic lateral sclerosis), genetic syndromes (e.g. Down syndrome), injury-related conditions (e.g. Traumatic Brain Injury, Chronic Traumatic Encephalopathy), and conditions typically considered as being purely psychiatric in nature, such as schizophrenia and depression.

Researchers have classified hundreds of diseases of the nervous system, such as brain tumors, epilepsy, Alzheimer's disease, Parkinson's disease and stroke, as well as conditions associated with old age, such as dementia. Some such conditions result from a progressive loss of synapses (junctions between two different neurons) and ultimately a loss of neurons (neurodegeneration). Unfortunately, neurodegenerative diseases have been almost completely resistant to treatment. Neurons in the brain communicate with each other by the sending neuron releasing chemicals (neurotransmitters) into the synapse, altering the electrical potential of the receiving neuron. The part of a neuron that releases the neurotransmitter is the axon (the presynaptic side of a synapse) and the part of the synapse that is affected by neurotransmitter is called a dendritic spine (the postsynaptic side of a synapse). Changes in the number, location and even shape of synaptic junctions underlie memory, learning, thinking and our personality. A part of the brain called the hippocampus is intimately involved in the formation of memories, and suffers from a notable loss of synapses and neurons in neurodegenerative diseases. The development of novel methods to restore spine density in the hippocampus could have important implications for treatment of a host of neurodegenerative and developmental cognitive disorders.

Thus, small molecules that promote spine formation have potential use in ameliorating cognitive deficiencies in neuronal disease, including neurodegenerative diseases such as Alzheimer's disease. However, there is a need for high purity single polymorph forms of compounds that are efficacious and exhibit improved pharmacokinetic and/or pharmacodynamic profiles for the treatment of diseases responsive to the promotion of spinogenesis, including neuronal diseases.

SUMMARY

Compound I exhibits activity in promoting spinogenesis and is described in, for example, International Publication No. WO 2019/028164 (Feb. 7, 2019), which is hereby incorporated by reference in its entirety. Compound I has the formula:

Compound I

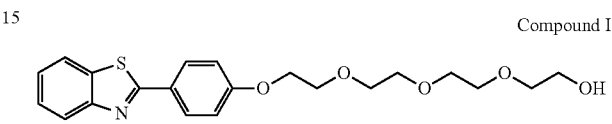

Compound I can be synthesized according to the methods described herein and those described in International Publication No. WO 2019/028164 (Feb. 7, 2019).

The present disclosure provides forms of Compound I and salts, co-crystals, hydrates, and solvates thereof. Also described herein are processes for making the forms of Compound I, pharmaceutical compositions comprising crystalline forms of Compound I and methods for using such forms and pharmaceutical compositions in the treatment of diseases responsive to spinogenesis. In some embodiments, the disease is a neuronal disease.

Thus, one embodiment is crystalline 2-(2-(2-(2-(4-(benzo[d]thiazol-2-yl)phenoxy)ethoxy)ethoxy)ethoxy)ethan-1-ol (Compound I Form I) characterized by an X-ray powder diffractogram comprising the following peaks: about 4.6, about 20.8, and about 23.7°2θ±0.2°2θ, as determined on a diffractometer using Cu-Kα radiation at a wavelength of 1.5406 Å.

Another embodiment is crystalline 2-(2-(2-(2-(4-(benzo[d]thiazol-2-yl)phenoxy)ethoxy)ethoxy)ethoxy)ethan-1-ol (Compound I Form II) characterized by an X-ray powder diffractogram comprising the following peaks: about 9.2, about 13.8, and about 16.1°2θ±0.2 °2θ, as determined on a diffractometer using Cu-Kα radiation at a wavelength of 1.5406 Å.

Another embodiment is crystalline 2-(2-(2-(2-(4-(benzo[d]thiazol-2-yl)phenoxy)ethoxy)ethoxy)ethoxy)ethan-1-ol (Compound I Form III) characterized by an X-ray powder diffractogram comprising the following peaks: about 7.7, about 10.3, and about 15.3 °2θ±0.2 °2θ, as determined on a diffractometer using Cu-Kα radiation at a wavelength of 1.5406 Å.

Another embodiment is crystalline 2-(2-(2-(2-(4-(benzo[d]thiazol-2-yl)phenoxy)ethoxy)ethoxy)ethoxy)ethan-1-ol (Compound I Form IV) characterized by an X-ray powder diffractogram comprising the following peaks: about 5.4, about 22.4, and about 23.3 °2θ±0.2 °2θ, as determined on a diffractometer using Cu-Kα radiation at a wavelength of 1.5406 Å.

Another embodiment is crystalline 2-(2-(2-(2-(4-(benzo[d]thiazol-2-yl)phenoxy)ethoxy)ethoxy)ethoxy)ethan-1-ol (Compound I Form V) characterized by an X-ray powder diffractogram comprising the following peaks: about 4.6, about 9.2, and about 23.1 °2θ±0.2 °2θ, as determined on a diffractometer using Cu-Kα radiation at a wavelength of 1.5406 Å.

Another embodiment is amorphous 2-(2-(2-(2-(4-(benzo[d]thiazol-2-yl)phenoxy)ethoxy)ethoxy)ethoxy)ethan-1-ol.

Some embodiments provided herein relate to crystalline forms of hydrates or co-crystals of Compound I.

Another embodiment is directed to pharmaceutical compositions comprising a form or forms of Compound I as described herein and one or more pharmaceutically acceptable carriers.

Another embodiment is directed to the use of a form of Compound I as described herein or a pharmaceutical composition as described herein for promoting spinogenesis in a patient in need thereof.

Another embodiment is directed to a method of treating a disease responsive to spinogenesis in a patient in need thereof comprising administering a therapeutically effective amount of a form of Compound I as described herein or a pharmaceutical composition as described herein. In some embodiments, the disease is a neuronal disease. In some embodiments, the disease is selected from Alzheimer's disease, Parkinson's disease, Parkinson's dementia, autism, fragile X syndrome, and traumatic brain injury.

Another embodiment is directed to the method of treating Alzheimer's disease in a subject in need thereof comprising administering a therapeutically effective amount of a form of Compound I as described herein or a pharmaceutical composition as described herein to the subject.

Another embodiment is directed to the use of a form of Compound I as described herein or a pharmaceutical composition as described herein in the treatment of a disease selected from Alzheimer's disease, Parkinson's disease, Parkinson's dementia, autism, fragile X syndrome, and traumatic brain injury. The disease may be Alzheimer's disease.

Another embodiment is directed to the use of a form of Compound I as described herein or a pharmaceutical composition as described herein in the manufacture of a medicament for the treatment of a disease selected from Alzheimer's disease, Parkinson's disease, Parkinson's dementia, autism, fragile X syndrome, and traumatic brain injury. The disease may be Alzheimer's disease.

In some embodiments, a process for preparing Compound I, or a pharmaceutically acceptable salt thereof is provided:

Compound I comprising contacting Compound A with Compound B to form Compound I:

Compound A

Compound B

H—(OCH$_2$CH$_2$)$_4$—OTs under first reaction conditions comprising a halide.

In some embodiments, the process for preparing Compound I further comprises contacting Compound C with Compound D to form Compound A:

Compound C

Compound D under second reaction conditions comprising a protic acid.

In some embodiments, the process for preparing Compound I further comprises contacting Compound E with p-toluenesulfonyl chloride to form Compound B:

Compound E

H—(OCH$_2$CH$_2$)$_4$—OH under third reaction conditions comprising a silver salt.

DETAILED DESCRIPTION

Figure 1:
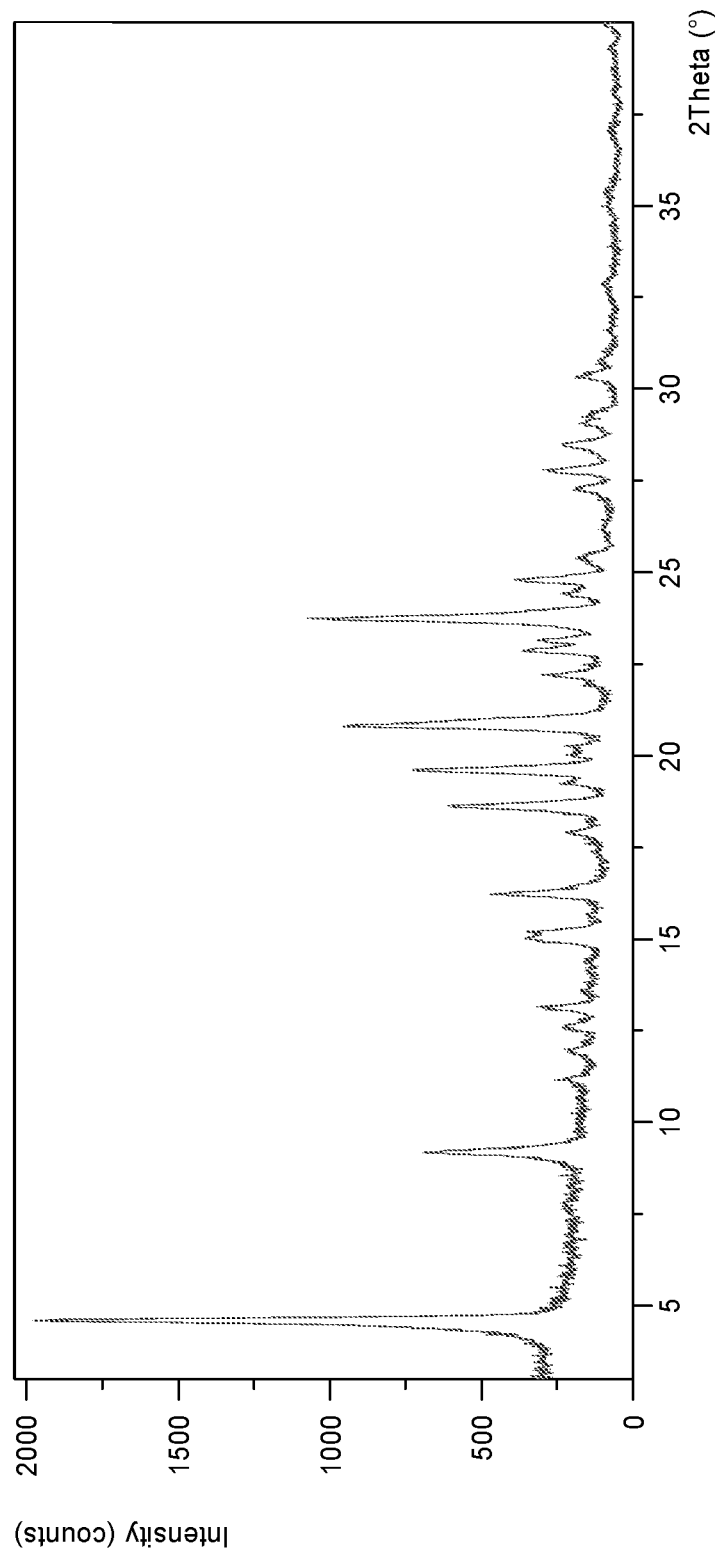
FIG. 1 shows an X-ray powder diffraction (XRPD) of Compound I Form I.

The compound 2-(2-(2-(2-(4-(benzo[d]thiazol-2-yl)phenoxy)ethoxy)ethoxy)ethoxy)ethan-1-ol designated herein as Compound I, has the formula:

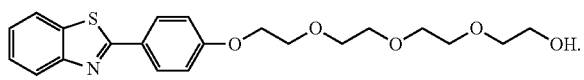 [SMILES: OCCOCCOCCOCCOc1ccc(-c2nc3ccccc3s2)cc1]

The present disclosure relates to various crystalline forms of Compound I, and processes for making the crystalline forms. Also described herein are Compound I in forms further labeled herein as "Compound I Form I," "Compound I Form II," "Compound I Form III," "Compound I Form IV," "Compound I Form V," and "amorphous Compound I." In some embodiments, such forms of Compound I may be anhydrous. In some embodiments, such forms of Compound I may be a solvate or a hydrate.

Additional crystalline forms of Compound I are also further described herein. In some embodiments, crystalline forms of Compound I may include salts or co-crystals of Compound I.

Definitions

As used in the present specification, the following words and phrases are generally intended to have the meanings as set forth below, except to the extent that the context in which they are used indicates otherwise.

The term "fascin" refers to a 54-58 kDa protein that is an actin cross-linking protein. The term "fascin" may refer to the amino acid sequence of human fascin 1. The term "fascin" includes both the wild-type form of the nucleotide sequences or proteins as well as any mutants thereof. In some embodiments, "fascin" is wild-type fascin. In some embodiments, "fascin" is one or more mutant forms. In some embodiments, a fascin is human fascin 1. In some embodiments, the fascin protein is encoded in the nucleotide sequence corresponding to reference number GI:347360903. In some embodiments, the fascin protein is encoded in the nucleotide sequence of RefSeq M_003088. In some embodiments, the fascin corresponds to the amino acid sequence of RefSeq NP_003079.1.

The term "spinogenesis" and the like refer, in the usual and customary sense, to development (e.g. growth and/or maturation) of dendritic spines in neurons. In some embodiments, the compounds provided herein promote spinogenesis without affecting spine morphology. The promotion is relative to the absence of administration of the compound.

As used herein, the term "dendrite" refers to the branched extension of a neuron cell. Dendrites are typically responsible for receiving electrochemical signals transmitted from the axon of an adjacent neuron. The terms "dendritic spines" or "dendrite spines" refer to protoplasmic protuberances on a neuron cell (e.g., on a dendrite). In some embodiments, dendritic spines may be described as having a membranous neck which may be terminated with a capitulum (e.g., head). Dendritic spines are classified according to their shape: headless, thin, stubby, mushroom, or branched. Dendritic spine density refers to the total number of dendritic spines per unit length of a neuron cell. For example, the dendritic spine density may be given as the number of dendritic spines per micron.

The term "dendritic spine formation" and the like refer, in the usual and customary sense to processes which lead to an increased number of dendritic spines or increased development of dendritic spines. The term "dendritic spine morphology" and the like refer, in the usual and customary sense, to physical characterization of a dendritic spine (e.g., shape and structure). Improvement of dendritic spine morphology is a change in morphology (e.g., increase in length or increase in width) that results in increased functionality (e.g., increased number of contacts between neurons or decreased space between neighboring neurons (e.g., synaptic cleft)). As known in the art and disclosed herein, exemplary methods for such characterization include measurement of the dimensions (i.e., length and width) of dendritic spines. Accordingly, the term "improving dendritic spine morphology" generally refers to an increase in length, width, or both length and width of a dendritic spine.

"Binding" refers to at least two distinct species (e.g. chemical compounds including biomolecules, or cells) to becoming sufficiently proximal to react or interact thereby resulting in the formation of a complex. For example, the binding of two distinct species (e.g., a protein and a compound described herein) may result in the formation of a complex wherein the species are interacting via non-covalent or covalent bonds. In some embodiments, the resulting complex is formed when two distinct species (e.g., a protein and a compound described herein) interact via non-covalent bonds (e.g., electrostatic, van der Waals, or hydrophobic).

As defined herein, the term "activation," "activate," "activating" and the like in reference to a protein-activator (e.g. agonist) interaction means positively affecting (e.g. increasing) the activity or function of the protein relative to the activity or function of the protein in the absence of the activator (e.g. compound described herein).

"Control" or "control experiment" is used in accordance with its plain ordinary meaning and refers to an experiment in which the subjects or reagents of the experiment are treated as in a parallel experiment except for omission of a procedure, reagent, or variable of the experiment. In some instances, the control is used as a standard of comparison in evaluating experimental effects.

"Contacting" is used in accordance with its plain ordinary meaning and refers to the process of allowing at least two distinct species (e.g. chemical compounds including biomolecules, or cells) to become sufficiently proximal to interact. The term "contacting" may include allowing two molecular species to react or physically touch, wherein the two species may be, for example, a compound as described herein, a biomolecule, a protein or an enzyme. In some embodiments contacting includes allowing a compound described herein to interact with a protein (e.g., fascin) or enzyme.

As defined herein, the terms "inhibition," "inhibit," "inhibiting" and the like, are to be given their customary meanings to those of skill in the art. In reference to a protein-inhibitor (e.g. antagonist) interaction, the terms "inhibition," "inhibit," "inhibiting" mean negatively affecting (e.g. decreasing) the functional activity of the protein relative to the functional activity of the protein in the absence of the inhibitor.

As used herein, the term "about" used in the context of quantitative measurements means the indicated amount ±10%, or alternatively the indicated amount ±5% or ±1%.

The term "complex" refers to a formation resulting from the interaction between Compound I and another molecule.

The term "solvate" refers to a complex formed by combining Compound I and a solvent. As used herein, the term "solvate" includes a hydrate (i.e., a solvate when the solvent is water).

The term "co-crystal" refers to a molecular complex of an ionized or non-ionized Compound I (or any other form, salt or compound disclosed herein) and one or more non-ionized co-crystal formers (such as a pharmaceutically acceptable salt) connected through non-covalent interactions. In certain embodiments, the co-crystal can have an improved property as compared to the free form (i.e., the free molecule, zwitter ion, hydrate, solvate, etc.) or a salt (which includes salt hydrates and solvates). In further embodiments, the improved property is selected from the group consisting of: increased solubility, increased dissolution, increased bioavailability, increased dose response, decreased hygroscopicity, a crystalline form of a normally amorphous compound, a crystalline form of a difficult to salt or unsaltable compound, decreased form diversity, more desired morphology, and the like.

The term "co-crystal former" or "co-former" refers to one or more pharmaceutically acceptable bases and/or pharmaceutically acceptable acids disclosed herein in association with Compound I, or any other compound disclosed herein.

Any formula or structure given herein, including Compound I, is also intended to represent unlabeled forms as well as isotopically labeled forms of the compounds. Isotopically labeled compounds have structures depicted by the formulae given herein except that one or more atoms are replaced by an atom having a selected atomic mass or mass number. Examples of isotopes that can be incorporated into compounds of the disclosure include isotopes of hydrogen, carbon, nitrogen, oxygen, phosphorous, fluorine and chlorine, such as, but not limited to $^2$H (deuterium, D), $^3$H (tritium), $^{11}$C, $^{13}$C, $^{14}$C, $^{15}$N, $^{18}$F, $^{31}$P, $^{32}$P, $^{35}$S, $^{36}$Cl and $^{125}$I. Various isotopically labeled compounds of the present disclosure, for example those into which isotopes such as $^3$H, $^{13}$C and $^{14}$C are incorporated, may be prepared. Such isotopically labeled compounds may be useful in metabolic studies, reaction kinetic studies, detection or imaging techniques, such as positron emission tomography (PET) or single-photon emission computed tomography (SPECT) including drug or substrate tissue distribution assays or in radioactive treatment of patients.

The disclosure also includes Compound I in which from 1 to "n" hydrogens attached to a carbon atom is/are replaced by deuterium, in which n is the number of hydrogens in the molecule. Such compounds exhibit increased resistance to metabolism and may be thus useful for increasing the half life of any Compound I when administered to a mammal. See, for example, Foster, "Deuterium Isotope Effects in Studies of Drug Metabolism", *Trends Pharmacol. Sci.* 5(12): 524-527 (1984). Such compounds are synthesized by means well known in the art, for example by employing starting materials in which one or more hydrogen atoms have been replaced by deuterium.

Deuterium labeled or substituted compounds of the disclosure may have improved DMPK (drug metabolism and pharmacokinetics) properties, relating to distribution, metabolism and excretion (ADME). Isotopically labeled compounds of this disclosure and prodrugs thereof can generally be prepared by carrying out the procedures disclosed in the schemes or in the examples and preparations described below by substituting a readily available isotopically labeled reagent for a non-isotopically labeled reagent. Further, substitution with heavier isotopes, particularly deuterium (i.e., $^2$H or D) may afford certain therapeutic advantages resulting from greater metabolic stability, for example increased in vivo half-life or reduced dosage requirements or an improvement in therapeutic index. Isotopic labeling for diagnostic purposes is also contemplated.

The concentration of such an isotope, specifically deuterium, may be defined by an isotopic enrichment factor. In the compounds of this disclosure any atom not specifically designated as a particular isotope is meant to represent any isotope of that atom. Unless otherwise stated, when a position is designated specifically as "H" or "hydrogen", the position is understood to have hydrogen at its natural abundance isotopic composition. Accordingly, in the compounds of this disclosure any atom specifically designated as a deuterium (D) is meant to represent deuterium in greater than natural abundance.

As used herein, "pharmaceutically acceptable carrier" includes excipients or agents such as solvents, diluents, dispersion media, coatings, antibacterial and antifungal agents, isotonic and absorption delaying agents and the like that are not deleterious to the compound of the invention or use thereof. The use of such carriers and agents to prepare compositions of pharmaceutically active substances is well known in the art (see, e.g., *Remington's Pharmaceutical Sciences*, Mace Publishing Co., Philadelphia, Pa. 17th Ed. (1985); and *Modern Pharmaceutics*, Marcel Dekker, Inc. 3rd Ed. (G. S. Banker & C. T. Rhodes, Eds.).

The term "therapeutically effective amount" refers to an amount of the compound as described herein that is sufficient to effect treatment as defined below, when administered to a patient (particularly a human) in need of such treatment in one or more doses. The therapeutically effective amount will vary, depending upon the patient, the disease being treated, the weight and/or age of the patient, the severity of the disease, or the manner of administration as determined by a qualified prescriber or care giver.

The term "treatment" or "treating" means administering a compound as described herein for the purpose of:
(i) delaying the onset of a disease, that is, causing the clinical symptoms or markers of the disease not to develop or delaying the development thereof,
(ii) inhibiting the disease, that is, slowing or arresting the development of clinical symptoms or markers thereof, or the spread of the disease; and/or
(iii) relieving the disease, that is, causing the regression of clinical symptoms or markers of the severity thereof.

Prevention" or "preventing" means any treatment of a disease or condition that causes the clinical symptoms of the disease or condition not to develop. Compounds may, in some embodiments, be administered to a subject (including a human) who is at risk or has a family history of the disease or condition.

"Subject" refers to an animal, such as a mammal (including a human), that has been or will be the object of treatment, observation or experiment. The methods described herein may be useful in human therapy and/or veterinary applications. In some embodiments, the subject is a mammal. In one embodiment, the subject is a human. When the subject is a human person, the subject may be referred to as a "patient."

The methods described herein may be applied to cell populations in vivo or ex vivo. "In vivo" means within a living individual, as within an animal or human. In this context, the methods described herein may be used therapeutically in an individual. "Ex vivo" means outside of a living individual. Examples of ex vivo cell populations include in vitro cell cultures and biological samples including fluid or tissue samples obtained from individuals. Such samples may be obtained by methods well known in the art. Exemplary biological fluid samples include blood, cerebrospinal fluid, urine, and saliva. In this context, the compounds and compositions described herein may be used for a variety of purposes, including therapeutic and experimental purposes. For example, the compounds and compositions described herein may be used ex vivo to determine the optimal schedule and/or dosing of administration of a compound of the present disclosure for a given indication, cell type, individual, and other parameters. Information gleaned from such use may be used for experimental purposes or in the clinic to set protocols for in vivo treatment. Other ex vivo uses for which the compounds and compositions described herein may be suited are described below or will become apparent to those skilled in the art. The selected compounds may be further characterized to examine the safety or tolerance dosage in human or non-human subjects. Such properties may be examined using commonly known methods to those skilled in the art.

In addition, abbreviations as used herein have respective meanings as follows:

| | |
|---|---|
| % RH | Percent relative humidity |
| μL | Microliter |
| μm | Micrometer |
| 2-MeTHF | 2-methyl tetrahydrofuran |
| ACN | Acetonitrile |
| API | Active pharmaceutical ingredient |
| CPME | Cyclopentyl methyl ether |
| DCM | Dichloromethane |
| DMF | Dimethylformamide |
| DMSO | Dimethyl sulfoxide |
| DSC | Differential scanning calorimetry |
| DVS | Dynamic vapor sorption |
| eq. | Equivalent |
| EtOAc or EA | Ethyl acetate |
| EtOH | Ethanol |
| g | Gram |
| h | Hour |
| IC | Ion chromatography |
| IPA | Isopropanol |
| IPE | Diisopropyl ether |
| IPAc or iPrOAc | Isopropyl acetate |
| kV | kilovolts |
| MEK | Methyl ethyl ketone |
| MeOH | Methanol |
| mA | Milliamps |
| mg | Milligram |
| MIBK | Methyl isobutyl ketone |
| min | Minute |
| mL or ml | Milliliter |
| MS | Mass spectrometry |
| MTBE | Methyl tert-butyl ether |
| NMP | N-Methyl pyrrolidone |
| NMR | Nuclear magnetic resonance |
| PE | Petroleum ether |
| PLM | Polarized light microscopy |
| RH | Relative humidity |
| RRT | Relative retention time |
| RT | Room temperature |
| s | Second |
| TFA | Trifluoroacetic acid |
| TGA | Thermogravimetric analysis |
| THF | Tetrahydrofuran |
| v/v | Volume to volume |
| wt | Weight |
| wt/wt | Weight to weight |
| XRPD | X-ray powder diffraction |

Forms of Compound I

As described generally above, the present disclosure provides crystalline forms of Compound I and co-crystals thereof. Additional forms are also discussed further herein.

Crystalline 2-(2-(2-(2-(4-(benzo[d]thiazol-2-yl)phenoxy)ethoxy)ethoxy)ethan-1-ol (Compound I Form I) is characterized by an X-ray powder diffractogram comprising the following peaks: about 4.6, about 20.8, and about 23.7°2θ±0.2°2θ, as determined on a diffractometer using Cu-Kα radiation at a wavelength of 1.5406 Å. The diffractogram comprises additional peaks at about 9.2, about 16.3, about 18.6, and about 19.6°2θ±0.2°2θ. Compound I Form I is also characterized by its full X-ray powder diffractogram substantially as shown in FIG. 1. Compound I Form I may be characterized by one or more, e.g., by 1, 2, 3, 4, 5, or 6, of the following XRPD peaks:

| Peak |
|---|
| 4.6 |
| 9.2 |
| 18.6 |
| 19.6 |
| 20.8 |
| 23.7 |

Figure 2:
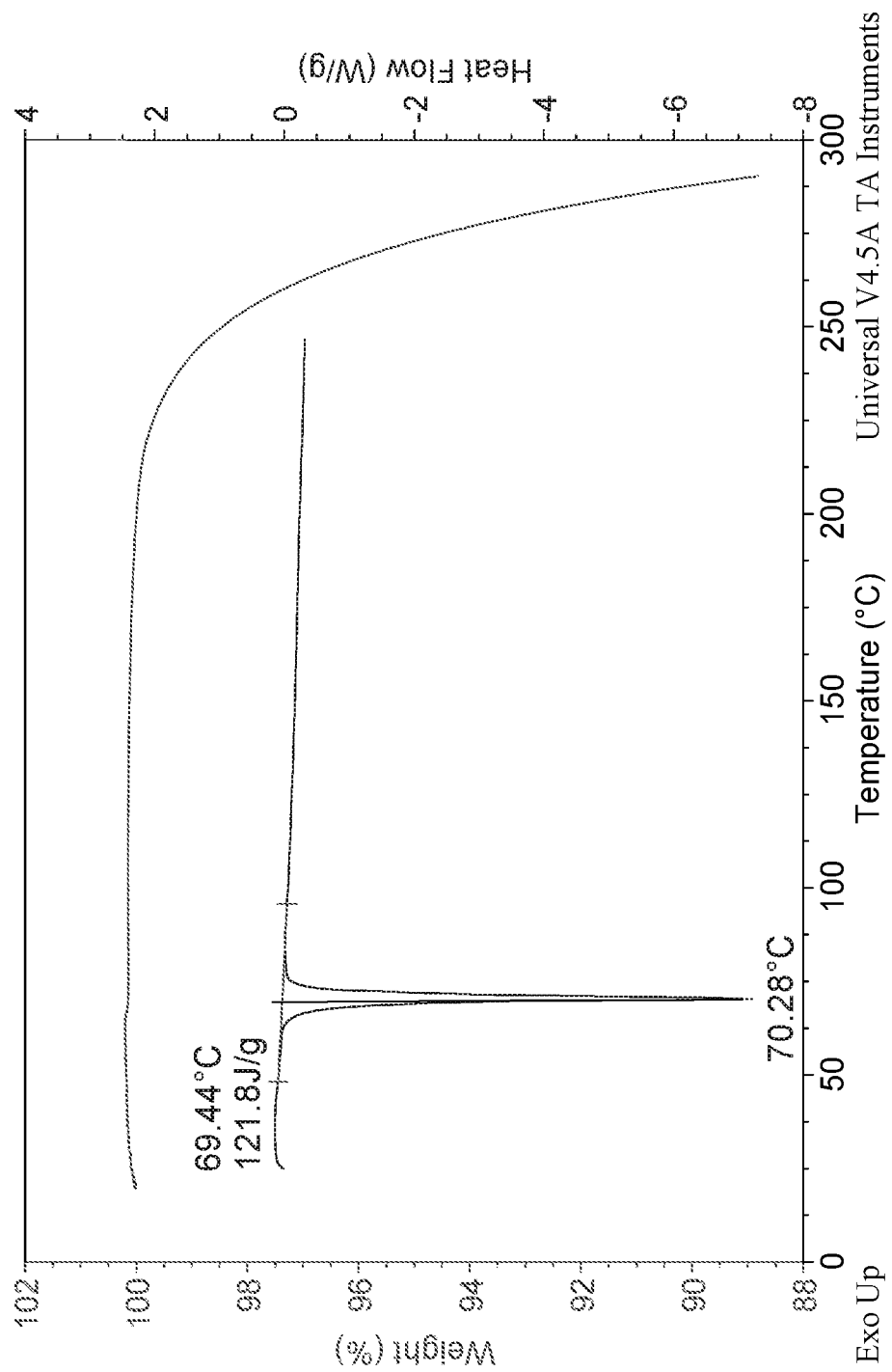
FIG. 2 shows a differential scanning calorimeter (DSC) curve and thermogravimetric analysis (TGA) of Compound I Form I.

In some embodiments, Compound I Form I is characterized by a differential scanning calorimetry (DSC) curve that comprises an endotherm peak at about 70° C.±2° C. Compound I Form I also is characterized by its full DSC curve substantially as shown in FIG. 2.

Figure 3:
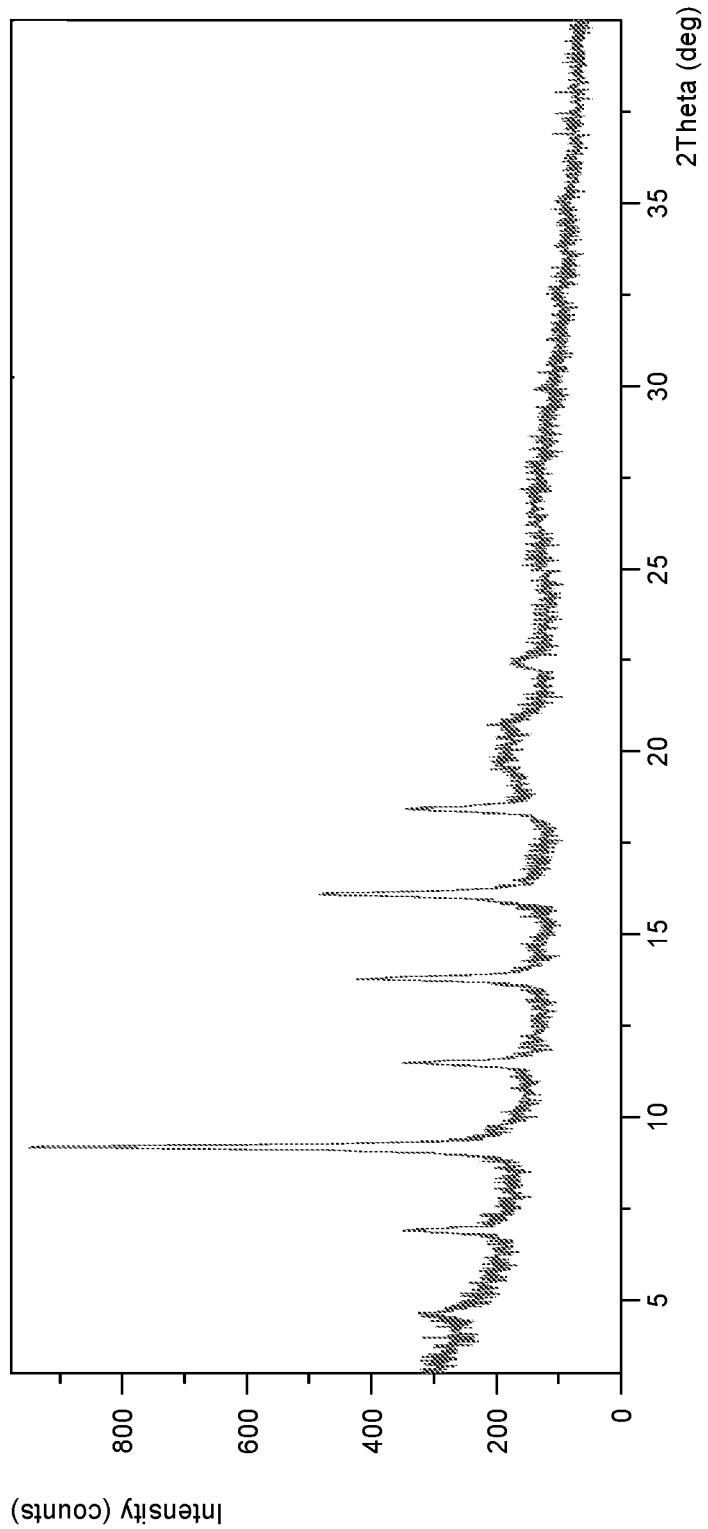
FIG. 3 shows an X-ray powder diffraction (XRPD) of Compound I Form II.

Crystalline 2-(2-(2-(2-(4-(benzo[d]thiazol-2-yl)phenoxy)ethoxy)ethoxy)ethan-1-ol (Compound I Form II) is characterized by an X-ray powder diffractogram comprising the following peaks: about 9.2, about 13.8, and about 16.1°2θ±0.2°2θ, as determined on a diffractometer using Cu-Kα radiation at a wavelength of 1.5406 Å. The diffractogram comprises additional peaks at about 6.9, about 11.5, and about 18.4°2θ±0.2°2θ. Compound I Form II is also characterized by its full X-ray powder diffractogram substantially as shown in FIG. 3. In some embodiments, Compound I Form II exists as wet a material. Compound I Form II may be characterized by one or more, e.g., by 1, 2, 3, 4, 5, or 6, of the following XRPD peaks:

| Peak |
|---|
| 6.9 |
| 9.2 |
| 11.5 |
| 13.8 |
| 16.1 |
| 18.4 |

Figure 4:
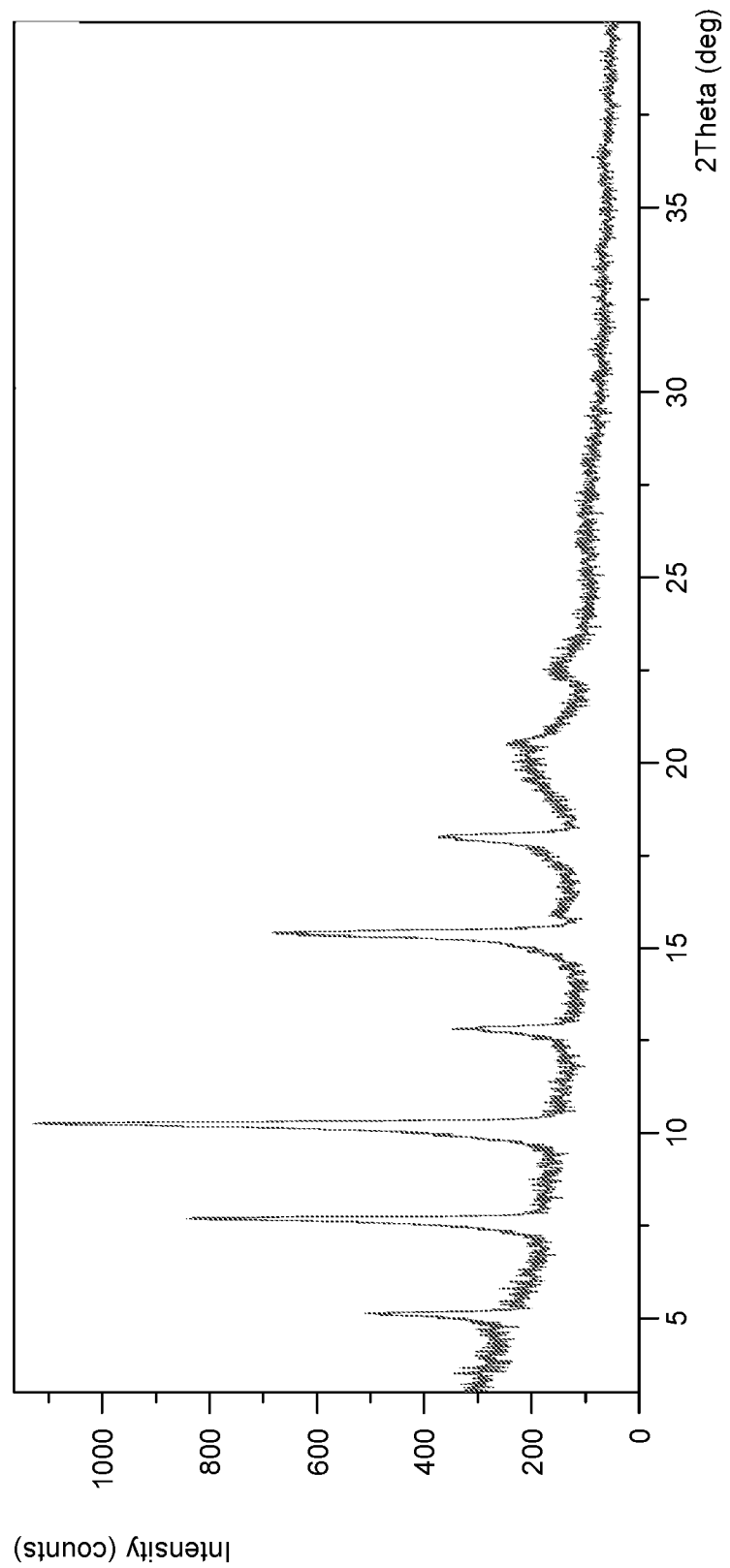
FIG. 4 shows an X-ray powder diffraction (XRPD) of Compound I Form III.

Crystalline 2-(2-(2-(2-(4-(benzo[d]thiazol-2-yl)phenoxy)ethoxy)ethoxy)ethan-1-ol (Compound I Form III) is characterized by an X-ray powder diffractogram comprising the following peaks: about 7.7, about 10.3, and about 15.3°2θ±0.2°2θ, as determined on a diffractometer using Cu-Kα radiation at a wavelength of 1.5406 Å. The diffractogram comprises additional peaks at about 5.1, about 12.8, and about 18.0°2θ±0.2°2θ. Compound I Form III is also characterized by its full X-ray powder diffractogram substantially as shown in FIG. 4. In some embodiments, Compound I Form III exists as wet a material. Compound I Form III may be characterized by one or more, e.g., by 1, 2, 3, 4, 5, or 6, of the following XRPD peaks:

| Peak |
|---|
| 5.1 |
| 7.7 |
| 10.3 |
| 12.8 |
| 15.3 |
| 18.0 |

Figure 5:
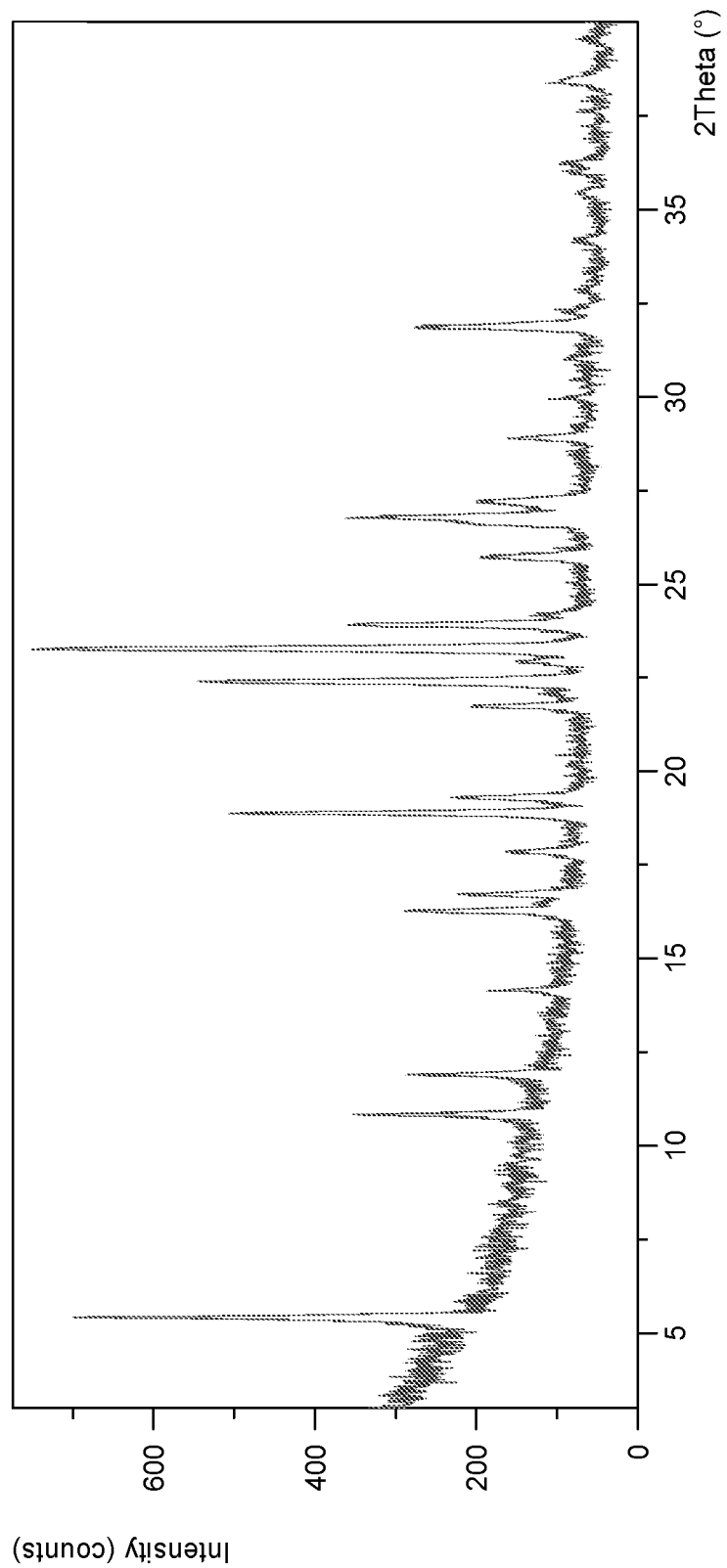
FIG. 5 shows an X-ray powder diffraction (XRPD) of Compound I Form IV.

Crystalline 2-(2-(2-(2-(4-(benzo[d]thiazol-2-yl)phenoxy)ethoxy)ethoxy)ethan-1-ol (Compound I Form IV) is characterized by an X-ray powder diffractogram comprising the following peaks: about 5.4, about 22.4, and about 23.3°2θ±0.2°2θ, as determined on a diffractometer using Cu-Kα radiation at a wavelength of 1.5406 Å. The diffractogram comprises additional peaks at about 10.8, about 18.9, about 23.9, and about 26.8°2θ±0.2°2θ. Compound I Form IV is also characterized by its full X-ray powder diffractogram substantially as shown in FIG. 5. Compound I Form IV may be characterized by one or more, e.g., by 1, 2, 3, 4, 5, or 6, of the following XRPD peaks:

| Peak |
|---|
| 5.4 |
| 10.8 |
| 18.9 |
| 22.4 |
| 23.3 |
| 23.9 |
| 26.8 |

Figure 6:
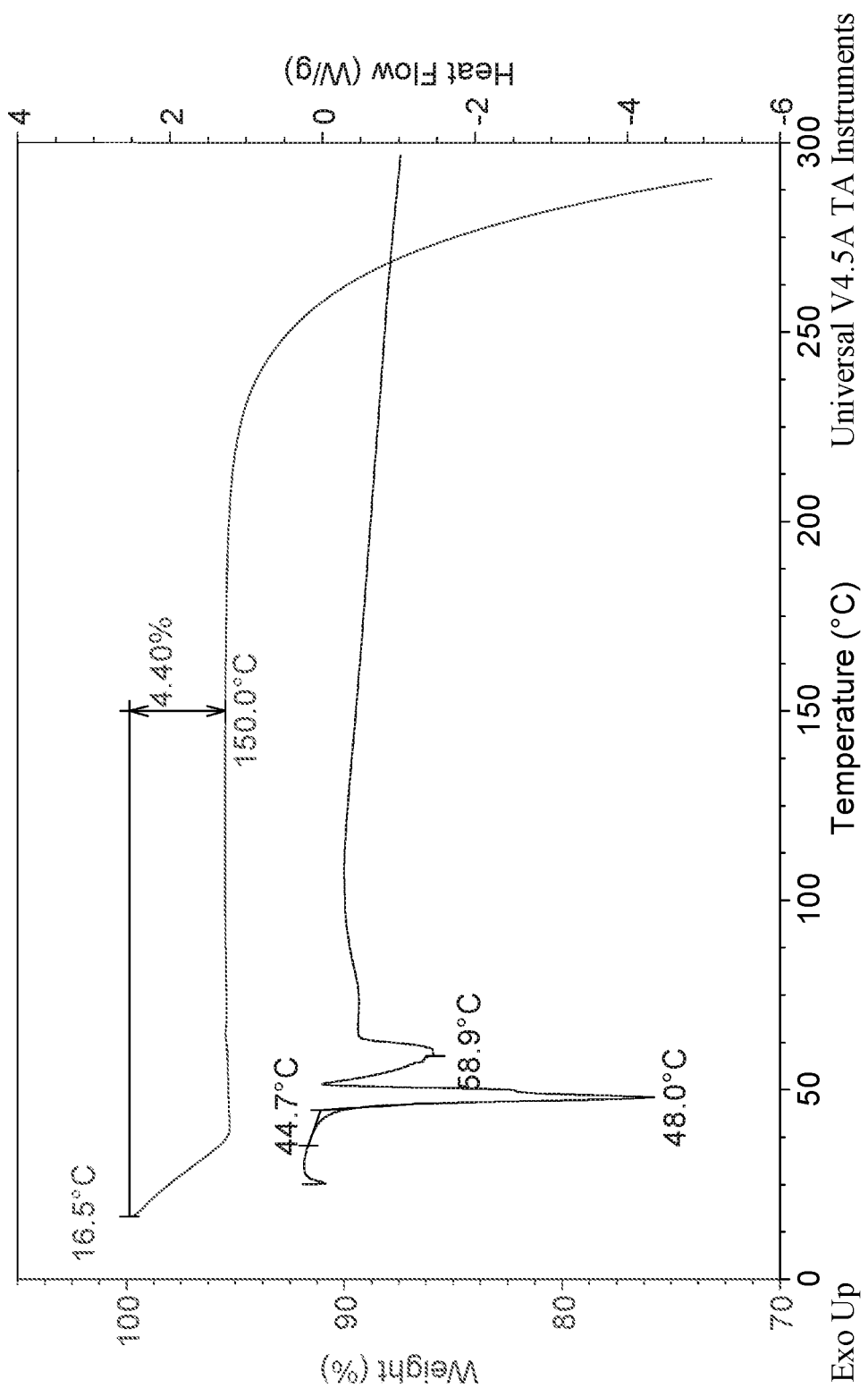
FIG. 6 shows a differential scanning calorimeter (DSC) curve and thermogravimetric analysis (TGA) of Compound I Form IV.

In some embodiments, Compound I Form IV is characterized by a differential scanning calorimetry (DSC) curve that comprises an endotherm peak at about 48° C.±2° C. and an endotherm peak at about 59° C.±2° C. Compound I Form IV also is characterized by its full DSC curve substantially as shown in FIG. 6.

Figure 7:
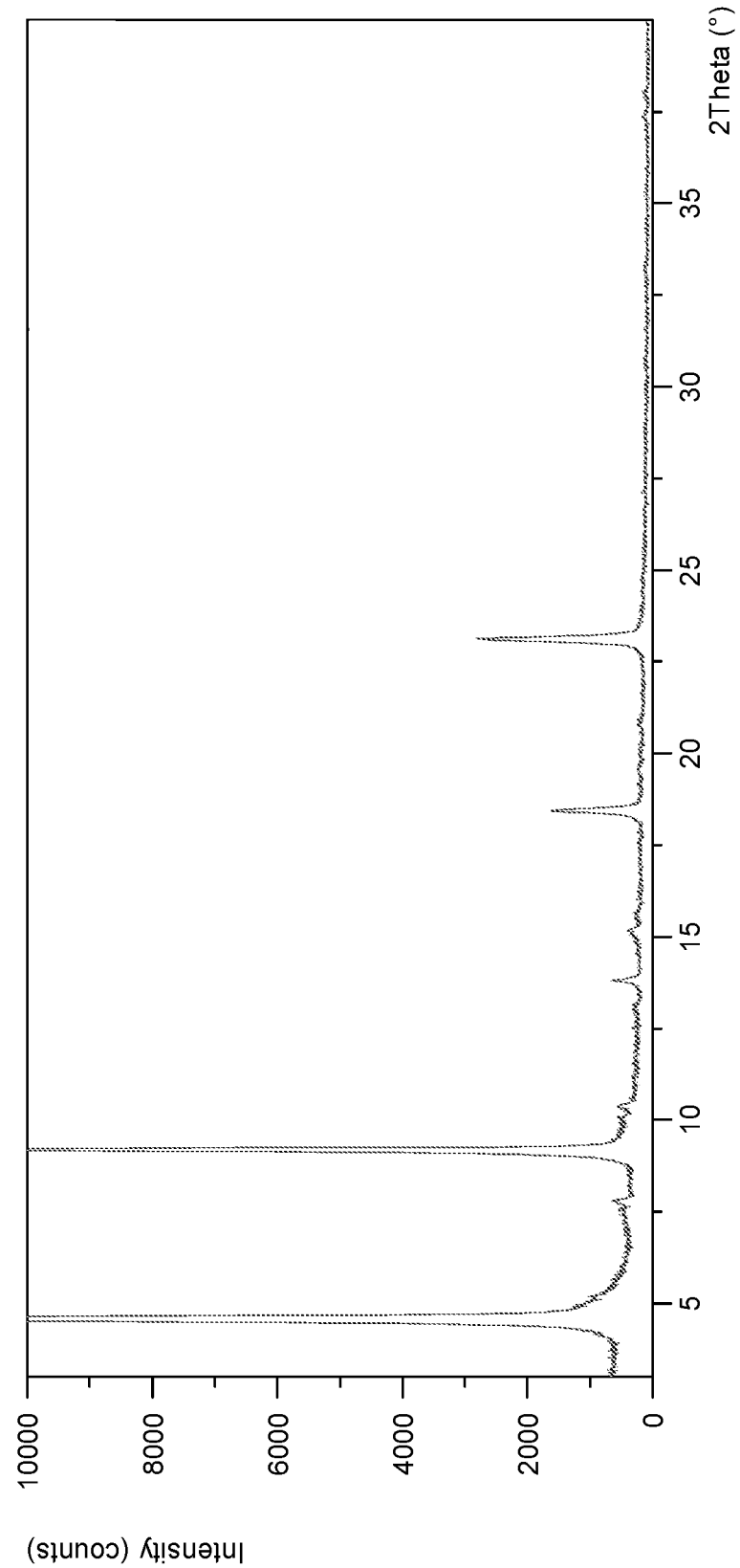
FIG. 7 shows an X-ray powder diffraction (XRPD) of Compound I Form V.

Crystalline 2-(2-(2-(2-(4-(benzo[d]thiazol-2-yl)phenoxy)ethoxy)ethoxy)ethan-1-ol (Compound I Form V) is characterized by an X-ray powder diffractogram comprising the following peaks: about 4.6, about 9.2, and about 23.1°2θ±0.2°2θ, as determined on a diffractometer using Cu-Kα radiation at a wavelength of 1.5406 Å. The diffractogram comprises additional peaks at about 13.8 and about 18.6°2θ±0.2°2θ. Compound I Form V is also characterized by its full X-ray powder diffractogram substantially as shown in FIG. 7. Compound I Form IV may be characterized by one or more, e.g., by 1, 2, 3, 4, 5, or 6, of the following XRPD peaks:

| Peak |
|---|
| 4.6 |
| 7.0 |
| 9.2 |
| 13.8 |
| 18.4 |
| 23.1 |

Figure 8:
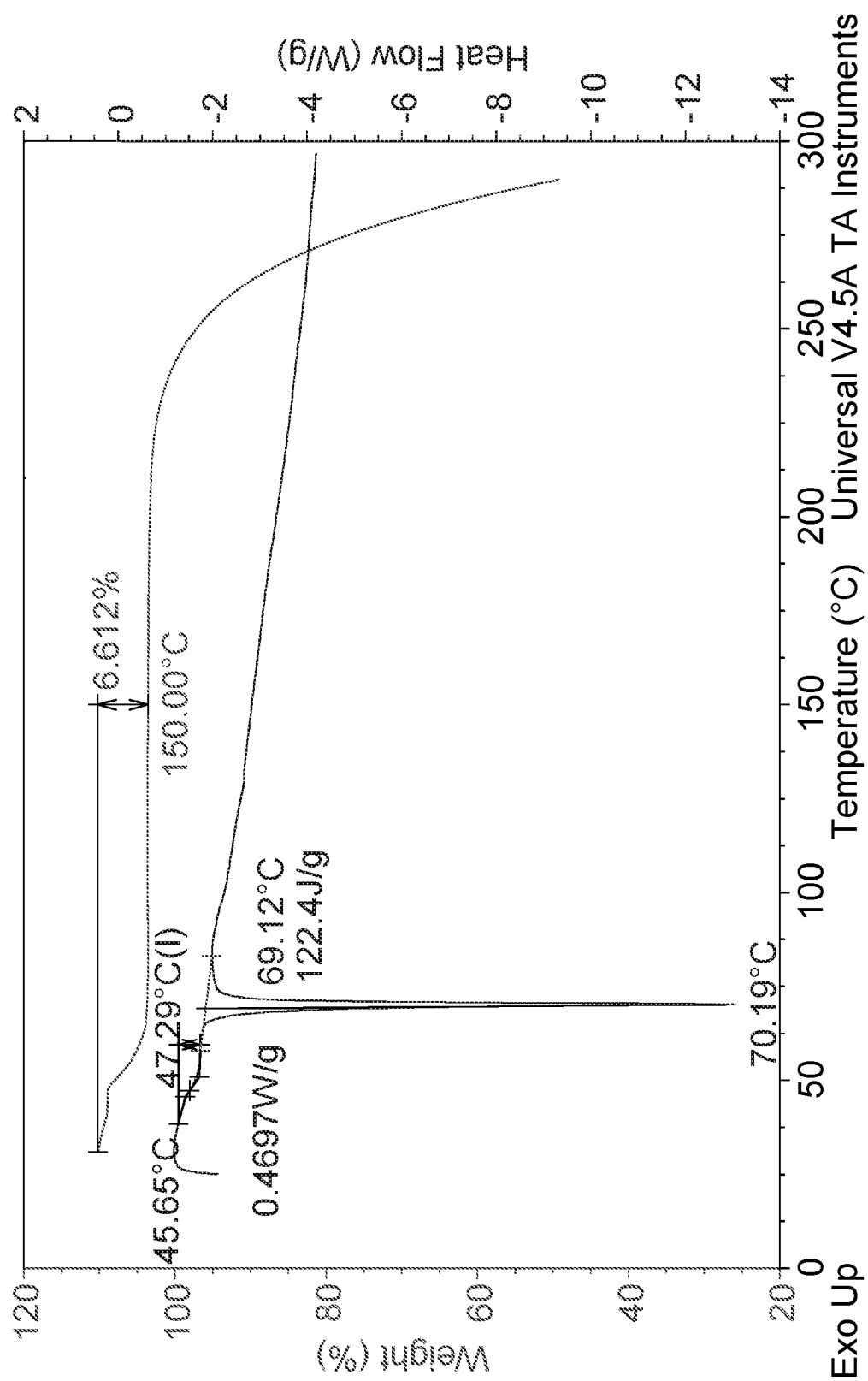
FIG. 8 shows a differential scanning calorimeter (DSC) curve and thermogravimetric analysis (TGA) of Compound I Form V.
Figure 9:
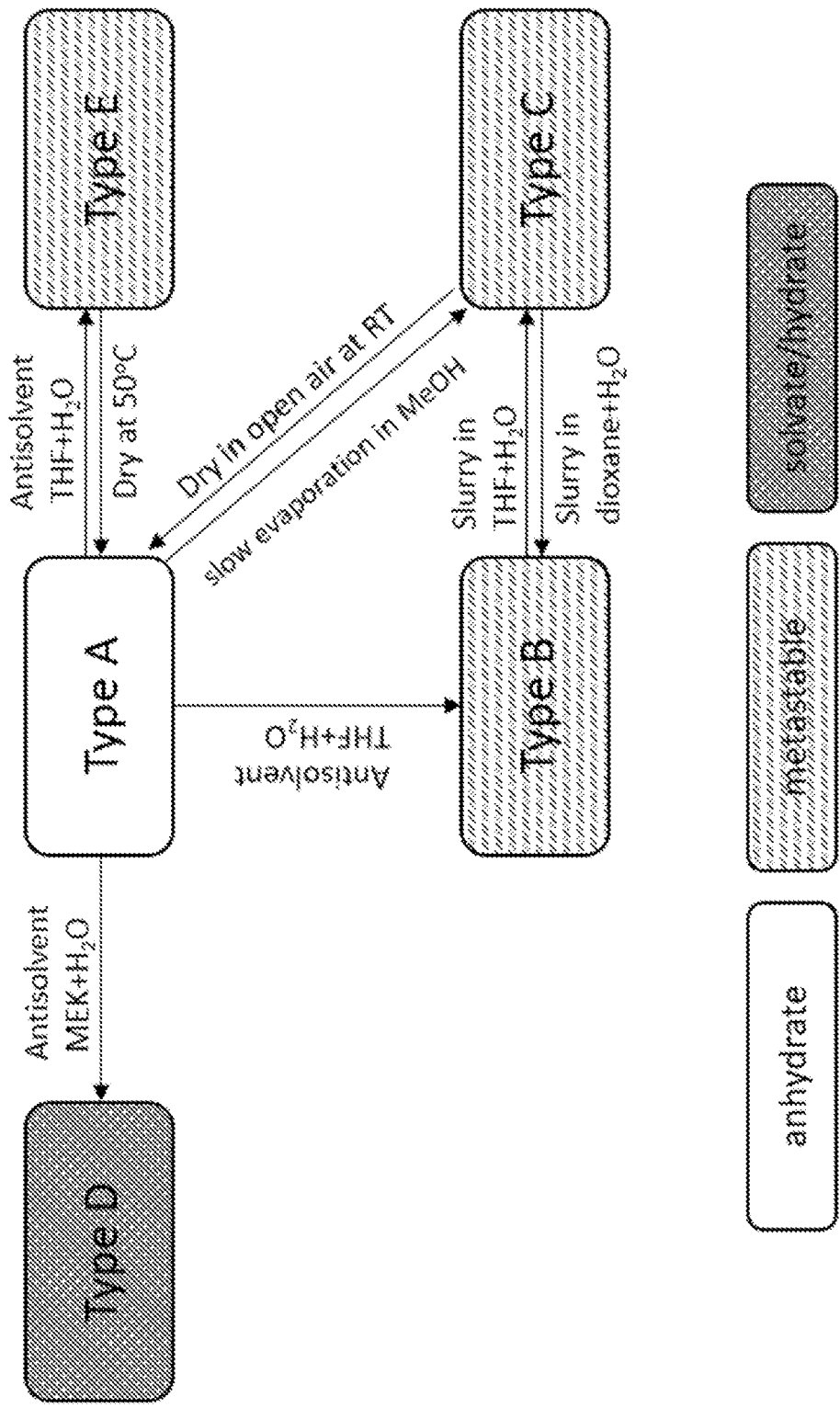
FIG. 9 shows an interconversion relationship of Compound I crystal forms obtained during polymorph screening.
Figure 10:
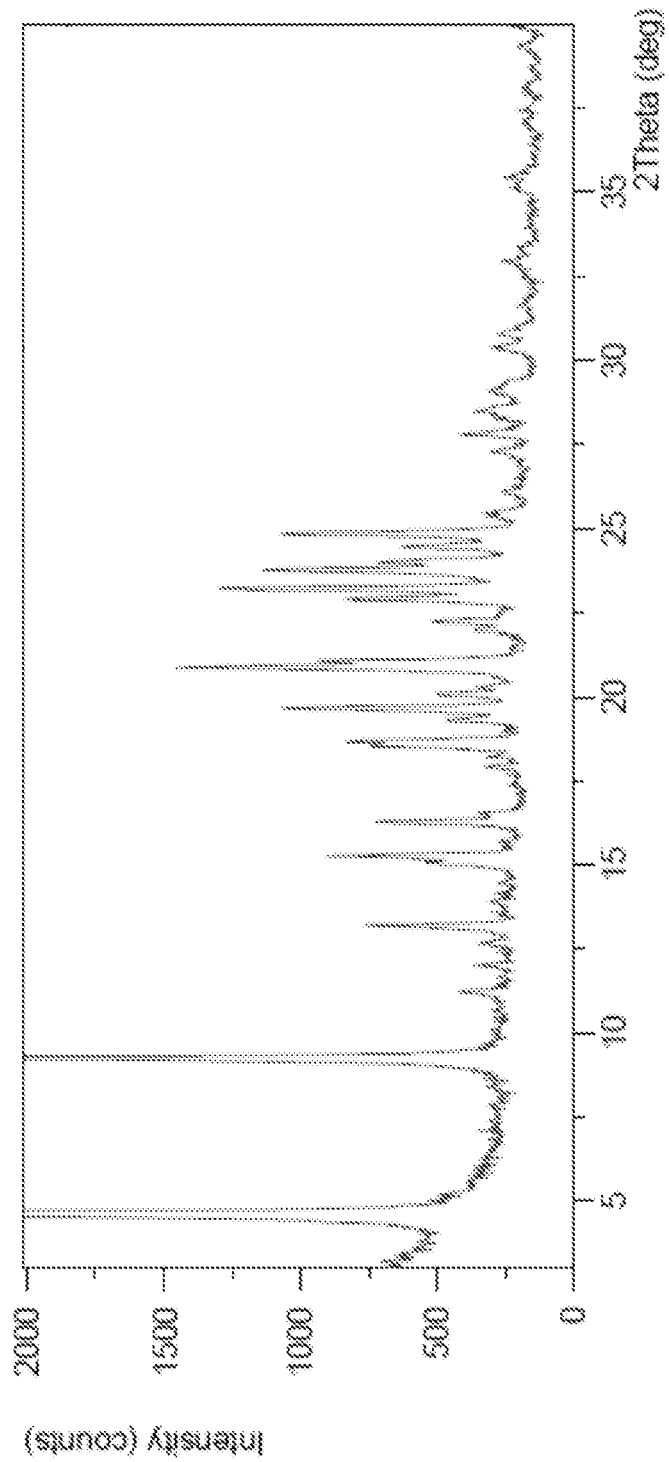
FIG. 10 shows an XRPD pattern of Compound I starting material.
Figure 11:
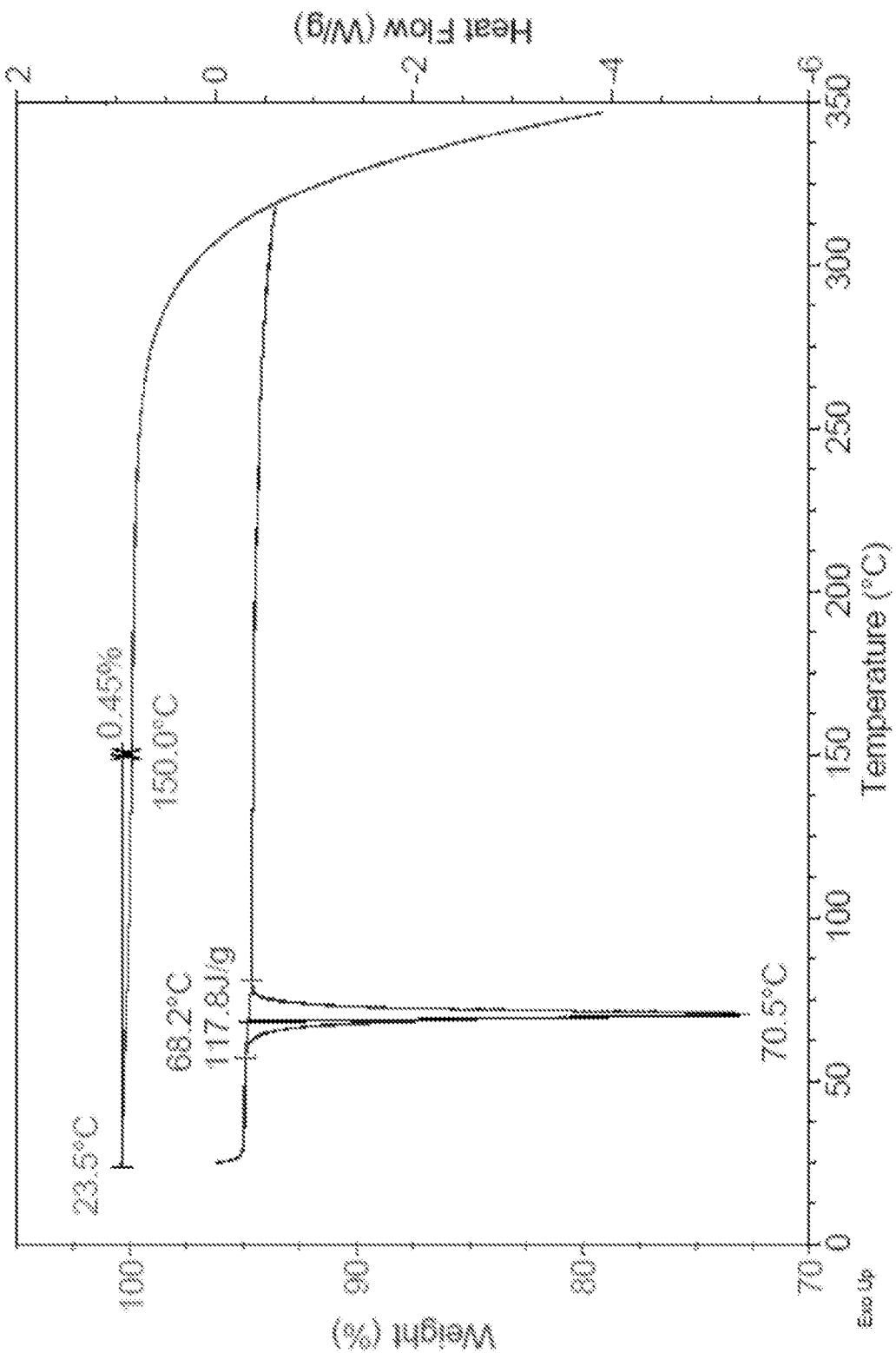
FIG. 11 shows TGA/DSC curves of Compound I starting material.

In some embodiments, Compound I Form V is characterized by a differential scanning calorimetry (DSC) curve that comprises an endotherm peak at about 70° C.±2° C. Compound I Form V also is characterized by its full DSC curve substantially as shown in FIG. 8.

Some embodiments are directed to compositions comprising a form of Compound I as described herein free of any other forms of Compound I. In some embodiments, a composition comprises greater than 95% of a form of Compound I as described herein relative to other forms of Compound I. In some embodiments, a composition comprises greater than 97% of a form of Compound I as described herein relative to other forms of Compound I. In some embodiments, a composition comprises greater than 99% a form of Compound I as described herein relative to other forms of Compound I.

Some embodiments are directed to compositions comprising crystalline Compound I Form I as described herein relative to other forms of Compound I. In some embodiments, a composition comprises greater than 95% of crystalline Compound I Form I as described herein relative to other forms of Compound I. In some embodiments, a composition comprises greater than 97% of crystalline Compound I Form I as described herein relative to other forms of Compound I. In some embodiments, a composition comprises greater than 99% crystalline Compound I Form I as described herein relative to other forms of Compound I.

In some embodiments, a composition comprises crystalline Compound I Form I in greater than 95% purity. In some embodiments, a composition comprises crystalline Compound I Form I in greater than 97% purity. In some embodiments, a composition comprises crystalline Compound I Form I in greater than 99% purity.

Some embodiments are directed to processes for making forms of Compound I as described herein. In some embodiments, the processes are as described in the Examples provided herein.

In some embodiments, a process for preparing Compound I Form I is selected from solid vapor diffusion, anti-solvent addition, liquid vapor diffusion, slow cooling, slurry conversion, temperature cycling, and slow evaporation. Solid vapor diffusion may be conducted at room temperature with a solvent selected from acetone, THF, EtOH, H$_2$O, EtOAc, dioxane, toluene, DCM, and acetonitrile. Anti-solvent addition may be conducted by adding an antisolvent selected from IPA, MTBE, CPME, and heptane to a solution of Compound I in a solvent selected from THF, MeOH, DCM, and EtOAc. Slow cooling may be conducted by cooling a solution of Compound I in a solvent or solvent system selected from MEK, dioxane:toluene optionally at a ratio of about 1:1 v/v, EtOAc:acetonitrile optionally at a ratio of 1:1 v/v, DCM:IPA optionally at a ratio of about 4:1 v/v, and THF:heptane optionally at a ratio of about 4:1 v/v. Slow evaporation may be conducted by allowing a solution of Compound I in a solvent or solvent system selected from THF, EtOAc, MEK, acetonitrile, and dioxane:H$_2$O optionally at a ratio of about 9:1 v/v.

In some embodiments, Compound I Form I is stable under conditions of 30° C./65% RH (closed or open) and 40° C./75% RH (closed or open) for at least 4 weeks. In some embodiments, Compound I Form I retains at least 99% purity after storage for at least 4 weeks optionally under conditions of 30° C./65% RH (closed or open) or 40° C./75% RH (closed or open).

Pharmaceutical Compositions and Dosage

The forms of Compound I as described herein may be administered in the form of a pharmaceutical composition. Thus, provided herein are also pharmaceutical compositions that contain one or more of the forms of Compound I described herein and one or more pharmaceutically acceptable vehicles selected from carriers, adjuvants and excipients. Suitable pharmaceutically acceptable vehicles may include, for example, inert solid diluents and fillers, diluents, including sterile aqueous solution and various organic solvents, permeation enhancers, solubilizers and adjuvants. Such compositions are prepared in a manner well known in the pharmaceutical art. See, e.g., Remington's Pharmaceutical Sciences, Mace Publishing Co., Philadelphia, Pa. 17th Ed. (1985); and Modern Pharmaceutics, Marcel Dekker, Inc. 3rd Ed. (G. S. Banker & C. T. Rhodes, Eds.). The pharmaceutical compositions may be administered alone or in combination with other therapeutic agents.

The pharmaceutical compositions may be administered in either single or multiple doses. The pharmaceutical composition may be administered by various methods including, for example, rectal, buccal, intranasal and transdermal routes. In certain embodiments, the pharmaceutical composition may be administered by intra-arterial injection, intravenously, intraperitoneally, parenterally, intramuscularly, subcutaneously, orally, topically, or as an inhalant.

One mode for administration is parenteral, for example, by injection. The forms in which the pharmaceutical compositions described herein may be incorporated for administration by injection include, for example, aqueous or oil suspensions, or emulsions, with sesame oil, corn oil, cottonseed oil, or peanut oil, as well as elixirs, mannitol, dextrose, or a sterile aqueous solution, and similar pharmaceutical vehicles.

Oral administration may be another route for administration of one or more of the forms of Compound I described herein. Administration may be via, for example, capsule or enteric coated tablets. In making the pharmaceutical compositions that include one or more of the forms of Compound I described herein, the active ingredient is usually diluted by an excipient and/or enclosed within such a carrier that can be in the form of a capsule, sachet, paper or other container. When the excipient serves as a diluent, it can be in the form of a solid, semi-solid, or liquid material, which acts as a vehicle, carrier or medium for the active ingredient. Thus, the compositions can be in the form of tablets, pills, powders, lozenges, sachets, cachets, elixirs, suspensions, emulsions, solutions, syrups, aerosols (as a solid or in a liquid medium), ointments containing, for example, up to 10% by weight of the active ingredient, soft and hard gelatin capsules, sterile injectable solutions, and sterile packaged powders.

Some examples of suitable excipients include lactose, dextrose, sucrose, sorbitol, mannitol, starches, gum acacia, calcium phosphate, alginates, tragacanth, gelatin, calcium silicate, microcrystalline cellulose, polyvinylpyrrolidone, cellulose, sterile water, syrup, and methyl cellulose. The formulations can additionally include lubricating agents such as talc, magnesium stearate, and mineral oil; wetting agents; emulsifying and suspending agents; preserving agents such as methyl and propylhydroxy-benzoates; sweetening agents; and flavoring agents.

The compositions that include one or more of the forms of Compound I described herein can be formulated so as to provide quick, sustained or delayed release of the active ingredient after administration to the subject by employing procedures known in the art. Controlled release drug delivery systems for oral administration include osmotic pump systems and dissolutional systems containing polymer-coated reservoirs or drug-polymer matrix formulations. Examples of controlled release systems are given in U.S. Pat. Nos. 3,845,770; 4,326,525; 4,902,514; and 5,616,345. Another formulation for use in the methods disclosed herein employ transdermal delivery devices ("patches"). Such transdermal patches may be used to provide continuous or discontinuous infusion of the forms of Compound I described herein in controlled amounts. The construction and use of transdermal patches for the delivery of pharmaceutical agents is well known in the art. See, e.g., U.S. Pat. Nos. 5,023,252, 4,992,445 and 5,001,139. Such patches may be constructed for continuous, pulsatile, or on demand delivery of pharmaceutical agents.

For preparing solid compositions such as tablets, the principal active ingredient may be mixed with a pharmaceutical excipient to form a solid preformulation composition containing a homogeneous mixture of the forms of Compound I described herein. When referring to these preformulation compositions as homogeneous, the active ingredient may be dispersed evenly throughout the composition so that the composition may be readily subdivided into equally effective unit dosage forms such as tablets, pills and capsules.

The tablets or pills of the forms of Compound I described herein may be coated or otherwise compounded to provide a dosage form affording the advantage of prolonged action, or to protect from the acid conditions of the stomach. For example, the tablet or pill can include an inner dosage and an outer dosage component, the latter being in the form of an envelope over the former. The two components can be separated by an enteric layer that serves to resist disintegration in the stomach and permit the inner component to pass intact into the duodenum or to be delayed in release. A variety of materials can be used for such enteric layers or coatings, such materials including a number of polymeric acids and mixtures of polymeric acids with such materials as shellac, cetyl alcohol, and cellulose acetate.

Compositions for inhalation or insufflation may include solutions and suspensions in pharmaceutically acceptable, aqueous or organic solvents, or mixtures thereof, and powders. The liquid or solid compositions may contain suitable pharmaceutically acceptable excipients as described herein. In some embodiments, the compositions are administered by the oral or nasal respiratory route for local or systemic effect. In other embodiments, compositions in pharmaceutically acceptable solvents may be nebulized by use of inert gases. Nebulized solutions may be inhaled directly from the nebulizing device or the nebulizing device may be attached to a facemask tent, or intermittent positive pressure breathing machine. Solution, suspension, or powder compositions may be administered, preferably orally or nasally, from devices that deliver the formulation in an appropriate manner.

The forms of Compound I as described herein may be administered in a pharmaceutically effective amount. For oral administration, each dosage unit can contain from 1 mg to 2 gram, 1 mg to 1 gram, or 1 mg to 500 mg of Compound I. In some embodiments, the dose is from 1 mg to 250 mg of Compound I. In some embodiments, a dose of Compound I ranges from about 20 mg twice a day to about 50 mg twice a day. In some embodiments, the dose is 2 mg, 4 mg, 6 mg, 8 mg, 10 mg, 12 mg, 14 mg, 16 mg, 18 mg, 20 mg, 25 mg, 25 mg, 30 mg, 35 mg, 40 mg, 45 mg, 50 mg, 75 mg, 100 mg, 200 mg, or 500 mg of Compound I. It will be understood, however, that the amount of the compound actually administered usually will be determined by a physician in light of the relevant circumstances including the condition to be treated, the chosen route of administration, and co-administration compound and if applicable, the age, weight, response of the individual patient, the severity of the patient's symptoms, and the like.

The forms of Compound I of the present application or the compositions thereof may be administered once, twice, three, or four times daily, using any suitable mode described above. Also, the forms of Compound I of the present application or the compositions thereof may be administered once or twice a week, once every two weeks, once every three weeks, once every four weeks, once every five weeks, or once every six weeks. In some embodiments, the forms of Compound I of the present application or the compositions thereof may be administered once daily for 4 weeks, 8 weeks, 12 weeks, 16 weeks, 20 weeks, 24 weeks, 28 weeks, 32 weeks, 36 weeks, 40 weeks, 44 weeks, 48 weeks, 52 weeks, or longer as needed.

The specific dose level of an active agent of the present application, for example a form of Compound I described herein, or a pharmaceutical composition thereof, for any particular subject will depend upon a variety of factors including the activity of the specific compound employed, the age, body weight, general health, sex, diet, time of administration, route of administration, and rate of excretion, drug combination and the severity of the particular disease in the subject undergoing therapy. For example, a dosage may be expressed as a number of milligrams of a compound described herein per kilogram of the subject's body weight (mg/kg). Dosages of between about 0.1 and 150 mg/kg may be appropriate. In some embodiments, about 0.1 and 100 mg/kg may be appropriate. In other embodiments a dosage of between 0.5 and 60 mg/kg may be appropriate. Normalizing according to the subject's body weight is particularly useful when adjusting dosages between subjects of widely disparate size, such as occurs when using the drug in both children and adult humans or when converting an effective dosage in a non-human subject such as dog to a dosage suitable for a human subject.

The daily dosage may also be described as a total amount of a compound described herein administered per dose or per day. Daily dosage of a compound described herein, or a salt thereof, may be between about 1 mg and 4,000 mg, between about 2,000 to 4,000 mg/day, between about 1 to 2,000 mg/day, between about 1 to 1,000 mg/day, between about 10 to 500 mg/day, between about 20 to 500 mg/day, between about 50 to 300 mg/day, between about 75 to 200 mg/day, or between about 15 to 150 mg/day.

When administered nasally, the total daily dosage for a human subject may be between 1 mg and 1,000 mg, between about 1,000-2,000 mg/day, between about 10-500 mg/day, between about 50-300 mg/day, between about 75-200 mg/day, or between about 100-150 mg/day. In various embodiments, the daily dosage is about 10 mg, about 30 mg, about 50 mg, about 75 mg, about 100 mg, about 200 mg, about 300 mg, about 400 mg, about 500 mg, about 600 mg, about 700 mg, about 800 mg, about 900 mg, or about 1000 mg, or a range of values therebetween.

A form of Compound I described herein, or a pharmaceutically acceptable salt thereof, or a pharmaceutical composition thereof, may be administered once, twice, three, or four times daily, using any suitable mode described above. Also, administration or treatment may be continued for a number of days; for example, commonly treatment would continue for at least 7 days, 14 days, or 28 days, for one cycle of treatment. Treatment cycles are well known, and are frequently alternated with resting periods of about 1 to 28 days, commonly about 7 days or about 14 days, between cycles. The treatment cycles, in other embodiments, may also be continuous. Administration or treatment may be continued indefinitely.

In a particular embodiment, the method comprises administering to the subject an initial daily dose of about 1 to 800 mg of a form of Compound I described herein, or a pharmaceutically acceptable salt thereof, or a pharmaceutical composition thereof, and increasing the dose by increments until clinical efficacy is achieved. Increments of about 5, 10, 25, 50, or 100 mg can be used to increase the dose. The dosage can be increased daily, every other day, twice per week, or once per week.

A form of Compound I described herein, or a pharmaceutically acceptable salt thereof, or a pharmaceutical composition thereof, may be administered under fed conditions. The term "fed conditions" or variations thereof refers to the consumption or uptake of food, in either solid or liquid forms, or calories, in any suitable form, before or at the same time when the active ingredients are administered. For example, a form of Compound I described herein, or a pharmaceutically acceptable salt thereof, or a pharmaceutical composition thereof, may be administered to the subject (e.g., a patient) within minutes or hours of consuming calories (e.g., a meal). In some embodiments, form of Compound I described herein, or a pharmaceutically acceptable salt thereof, or a pharmaceutical composition thereof, may be administered to the subject (e.g., a patient) within 5-10 minutes, about 30 minutes, or about 60 minutes of consuming calories.

Treatment Methods and Uses

Fascin

Described herein are methods for the regeneration of spine synapses lost to neurodegenerative conditions by targeting a cytoskeletal protein by administering to a subject a form of Compound I described herein. Unexpectedly, it was observed that inhibition of the cytoskeletal protein fascin 1 (FSCN1) resulted in a rapid upregulation of dendritic spines in vivo and in vitro. Dendritic spines contain filamentous actin (F-actin), a cytoskeletal polymer that gives structure to cells and their subcellular specializations. Without wishing to be limited by theory, it is believed that dendritic spines require the formation of highly branched assemblies of F-actin, and formation of such assemblies may be precluded, or significantly reduced, by bundling into parallel arrays by fascin 1.

In some embodiments, a method of binding a fascin protein is provided, the method comprising contacting the fascin protein with an effective amount of Compound I described herein, or a pharmaceutically acceptable salt thereof. In some embodiments, the method inhibits fascin. It is believed that a form of Compound I, or a pharmaceutically acceptable salt thereof, may promote dendritic spine formation by inhibiting fascin.

Fascin is an important actin cross-linker that has no amino-acid sequence homology with other actin-binding proteins. Three forms of fascin are found in vertebrates: fascin 1, widely found in the nervous system and elsewhere; fascin 2 found in the retinal photoreceptor cells; and fascin 3, which is only found in the testes. In some embodiments, a fascin is human fascin 1. Fascin has a molecular mass of 55 kDa, functions as a monomeric entity, and cross-links actin filaments into straight, compact and rigid bundles, to impart mechanical stiffness to actin bundles. It is believed that fascin holds parallel actin filaments together to form filopodia on the order of 60-200 nm in diameter.

During neuron development, it is believed that long bundles of f-actin push out the membrane of the neuron to form structures such as axons, dendrites, filopodia and lamellipodia. Fascin is thought to be involved in cytoskeletal reorganization of nascent dendritic protrusions. Thus, actin bundling by fascin is generally believed to be required for the formation and extension of axons and dendrites. Surprisingly, it was found that inhibiting the activity of fascin in formation of actin bundles promotes the formation of dendritic spines, protrusions of the cytoplasmic membrane of dendrites.

Neuronal Diseases and Conditions and Treatment Thereof

A unifying feature of neurodegenerative conditions with a cognitive component is the loss of synapses that utilize the amino acid glutamate as a neurotransmitter ("glutamatergic" synapses), which in humans and other mammals are believed to be the most numerous type of synapse. Importantly, about 90% of glutamatergic synapses involve a post-synaptic dendritic spine. The majority of synapses lost in neurodegenerative conditions are those in which the axon makes contact with a dendritic spine, so-called "axospinous synapses". Under normal conditions, changes in the density, shape, and protein composition of dendritic spines impact the strength of synaptic communication, and are the basis of several forms of synaptic change (i.e. "plasticity") involved in learning and memory, cognitive flexibility, adaptation to injury and disease, and other processes. These changes in axospinous synapses are believed to be important for the memory encoding functions of structures such as the hippocampus. Accordingly, an early and progressive loss of dendritic spines in hippocampus and other regions is believed to be a driver of memory loss and cognitive decline in Alzheimer's disease and other dementias. The development of novel methods to regenerate spine density could have important implications for treatment of a host of neurodegenerative and developmental cognitive disorders.

Dendritic spines are specialized protrusions responsible for receiving synaptic inputs, providing an important function in communication between neurons. The morphology of dendritic spines and their overall density correlates with synaptic function and are strongly implicated in memory and learning. Cellular changes in brain cells may contribute to pathogenesis of a neuronal disease. For example, an aberrant level (e.g., reduction) in dendritic spine density in the brain may contribute to the pathogenesis of the neuronal disease. Consequently, alteration or misregulation of dendritic spines is believed to influence synaptic function and play a major role in various neurological and psychiatric disorders such as autism, fragile X syndrome, Parkinson's Disease (PD) and Alzheimer's Disease (AD). For example, in AD there is mounting evidence suggesting deficits begin with alterations of hippocampal synaptic function caused by amyloid-β (Aβ) protein prior to neuronal loss. Therefore, treatment strategies that target the initial synaptic loss, rather than late stage disease intervention, may provide a better prognosis for the treatment of AD. Furthermore, since most cognitive disorders elicit abnormalities in the form and function of dendritic spines, it would be desirable to target them directly using a small molecule to alter or alleviate these spine changes. For example, Fragile X syndrome is characterized by an overabundance of immature spines.

Provided herein are methods useful for promoting spinogenesis. In some embodiments, the method comprises administering to the subject an effective amount of a form of Compound I described herein, or a pharmaceutical composition thereof, as described herein including embodiments. Spinogenesis may be observed as an increase in the average number of spines per neuron, or a unit length of a neuron, which may be referred to as an increase in dendritic spine density. Spinogenesis may be observed as an improvement in dendritic spine morphology. For example, an improvement in dendritic spine morphology may be observed as an increase in average size of spine heads. Spinogenesis may be observed as an improvement in dendritic spine size, spine plasticity, spine motility, spine density and/or synaptic function. Spinogenesis may be observed as an increase in local spatial average of membrane potential. Spinogenesis may be observed as an increase in postsynaptic concentration (e.g., volume-averaged) of Ca2+. Spinogenesis may be observed as an increase in the average ratio of matured to immature spines. In some embodiments, a form of Compound I described herein, or a pharmaceutical composition thereof, increases the dendritic spine density relative to a control. In some embodiments, a form of Compound I described herein, or a pharmaceutical composition thereof, increases the dendritic spine density relative to that observed at the time that treatment is initiated. In some embodiments, the increase in dendritic spine density results in a reduction in symptoms of a neuronal disease or disorder in a subject or patient. In some embodiments, the increase in dendritic spine density is accounted for by anatomical observation. In some embodiments, the increase in dendritic spine density is observed in primary hippocampal neurons.

In some embodiments, the average dendritic spine density, relative to the time that treatment with a form of Compound I described herein, or a pharmaceutical composition thereof, is initiated, increases by at least about 5%, 10%, 15%, 20%, 25%, 30%, 35%, 40%, 45%, 50%, 60%, 70%, 80%, 90%, 100%, 125%, 150%, 175%, 200%, 250%, 300%, 400%, 500%, 750%, or 1000%, or any range between any two of the numbers, end points inclusive. In some embodiments, the dendritic spine density, relative to the time that treatment with a form of Compound I described herein, or a pharmaceutical composition thereof, is initiated, increases by about 50% to about 500%. In some embodiments, the dendritic spine density, relative to the time that treatment with a form of Compound I described herein, or a pharmaceutical composition thereof, is initiated, increases by about 100% to about 300%. In some embodiments, the dendritic spine density, relative to the time that treatment with a form of Compound I described herein, or a pharmaceutical composition thereof, is initiated, increases by about 200% to about 300%. In some embodiments, the duration of treatment with a form of Compound I described herein, or a pharmaceutical composition thereof, is 15 minutes, 30 minutes, 1 hour, 2 hours, 4 hours, 8 hours, 1 day, 3 days, 5 days, 7 days, 14 days, 28 days, 90 days, 180 days, or 365 days.

In some embodiments, the method increases spine density through promoting the formation of new spines. In some embodiments, the method increases the average spine density by at least about 5%, 10%, 15%, 20%, 25%, 30%, 35%, 40%, 45%, 50%, 60%, 70%, 80%, 90%, 100%, 125%, 150%, 175%, 200%, 250%, 300%, 400%, 500%, 750%, or 1000%, or any range between any two of the numbers, end points inclusive, relative to a control (e.g., the spine density in the absence of the compound). In some embodiments, the method increases the average spine density about 50% to about 500% relative to a control (e.g., the spine density in the absence of the compound). In some embodiments, the method increases the spine density about 100% to about 300% relative to a control (e.g., the spine density in the absence of the compound). In some embodiments, the method increases the spine density about 200% to about 300% relative to a control (e.g., the spine density in the absence of the compound).

In some embodiments, the method increases spine density through increasing a neuron length. In some embodiments, the method increases the average neuron length, relative to the time that treatment with a form of Compound I described herein, or a pharmaceutical composition thereof, is initiated, by about 100 nm, 300 nm, 500 nm, 700 nm, 1 micron, 2 microns, 3 microns, 4 microns, 5 microns, 7 microns, 10 microns, 15 microns, 20 microns, 25 microns, or any range between any two of the numbers, end points inclusive. In some embodiments, the method increases the average neuron length about 500 nm to about 25 microns relative to a control (e.g., the neuron length in the absence of the compound). In some embodiments, the method increases the neuron length about 10% to about 300% relative to a control (e.g., the neuron length in the absence of the compound). In some embodiments, the method increases the neuron length about 200% to about 300% relative to a control (e.g., the neuron length in the absence of the compound).

In some embodiments, the method increases the average number of spines per neuron, relative to the time that treatment with a form of Compound I described herein, or a pharmaceutical composition thereof, is initiated. In some embodiments, average number spines per unit length of a neuron increases by at least about 10, 20, 30, 40, 50, 60, 70, 80, 90, 100, 200, 300, 400, 500, 600, 700, 800, 900, or about 1000 more, or any range between any two of the numbers, end points inclusive. In some embodiments, the time is 1 hour, 2 hours, 4 hours, 8 hours, 1 day, 3 days, 5 days, 7 days, 14 days, 28 days, 90 days, 180 days, or 365 days.

In some embodiments, a form of Compound I described herein, or a pharmaceutical composition thereof, is useful in the treatment of neuronal diseases and disorders. A neuronal disease is a disease or condition in which the function of a subject's nervous system becomes impaired. The neuronal disease or disorder may be a neurological disease or disorder. The neuronal disease or disorder may be associated with a neurodegenerative disease or disorder.

In an aspect is provided a method of treating a neuronal disease in a patient in need thereof, the method comprising administering a therapeutically effective amount of a form of Compound I described herein, or a pharmaceutical composition thereof, to the patient. In some embodiments, the neuronal disease is Alzheimer's disease. In some embodiments, the neuronal disease is Parkinson's disease. In some embodiments, the neuronal disease is Parkinson's dementia. In some embodiments, the neuronal disease is autism. In some embodiments, the neuronal disease is fragile X syndrome. In some embodiments, the disease or disorder is related to (e.g. characterized by) an accumulation of amyloid plaques. In some embodiments, the neuronal disease is a traumatic brain injury. In some embodiments, a patient having a neuronal disease has suffered a traumatic brain injury before, during, or after the onset of the neuronal disease. In some embodiments, the neuronal disease includes a neuronal impairment. A neuronal impairment may include atrophy or other decrease in the effective functioning of the neuron. For example, it is known that Alzheimer's disease presents with neuronal impairment, especially in cortical neurons, e.g., hippocampal neurons and neurons in proximity to the hippocampus. Loss of synapses may correlate with loss of dendritic spines and neurodegeneration.

In some embodiments, the neuronal disease is associated with abnormal dendritic spine morphology, spine size, spine plasticity, spine motility, spine density and/or abnormal synaptic function. In some embodiments, the neuronal disease is associated with an abnormal (e.g., reduced) level of dendritic spine density.

In some embodiments, the neuronal disease is Alzheimer's disease. In some embodiments, the neuronal disease is Parkinson's disease. In some embodiments, the neuronal disease is Parkinson's disease accompanied by dementia. In some embodiments, the neuronal disease is autism. In some embodiments, the neuronal disease is stroke. In some embodiments, the neuronal disease is posttraumatic stress disorder (PTSD). In some embodiments, the neuronal disease is traumatic brain disorder (TBD). In some embodiments, the neuronal disease is chronic traumatic encephalopathy (CTE). In some embodiments, the neuronal disease is schizophrenia. In some embodiments, the neuronal disease is dementia (e.g., general dementia). In some embodiments, the neuronal disease is attention-deficit/hyperactivity disorder (ADHD). In some embodiments, the neuronal disease is amyotrophic lateral sclerosis (ALS). In some embodiments, the neuronal disease is frontotemporal lobar degeneration (FTLD) (e.g., FTLD-tau, FTLD-TDP, or FTLD-FUS). In some embodiments, the neuronal disease is memory loss. In some embodiments, the neuronal disease includes memory loss. In some embodiments, the neuronal disease is age-related memory loss. In some embodiments, the neuronal disease includes age-related memory loss. In some embodiments, the neuronal disease is hypertensive encephalopathy. In some embodiments, the neuronal disease is chronic stress. In some embodiments, the neuronal disease includes chronic stress. In some embodiments, the neuronal disease is FTLD-TDP Form I. In some embodiments, the neuronal disease is FTLD-TDP Form II. In some embodiments, the neuronal disease is FTLD-TDP Form III. In some embodiments, the neuronal disease is FTLD-TDP Form IV.

Examples of neuronal diseases that may be treated with a form of Compound I described herein, or a pharmaceutical composition thereof, or a method described herein, include Alexander's disease, Alper's disease, Alzheimer's disease, depression, perinatal asphyxia, Parkinson's disease dementia ("PD dementia"), amyotrophic lateral sclerosis, ataxia telangiectasia, Batten disease (also known as Spielmeyer-Vogt-Sjogren-Batten disease), spongiform encephalopathy (e.g., bovine spongiform encephalopathy (mad cow disease), Kuru, Creutzfeldt-Jakob disease, fatal familial insomnia, Canavan disease, Cockayne syndrome, corticobasal degeneration, fragile X syndrome, frontotemporal dementia, Gerstmann-Straussler-Scheinker syndrome, Huntington's disease, HIV-associated dementia, Kennedy's disease, Krabbe's disease, Lewy body dementia, Machado-Joseph disease (Spinocerebellar ataxia type 3), multiple sclerosis, multiple system atrophy, narcolepsy, neuroborreliosis, Parkinson's disease, Pelizaeus-Merzbacher Disease, Pick's disease, primary lateral sclerosis, prion diseases, Refsum's disease, Sandhoff's disease, Schilder's disease, subacute combined degeneration of spinal cord secondary to pernicious anaemia, schizophrenia, spinocerebellar ataxia (multiple types with varying characteristics), spinal muscular atrophy, Steele-Richardson-Olszewski disease, Tabes *dorsalis*, drug-induced Parkinsonism, progressive supranuclear palsy, corticobasal degeneration, multiple system atrophy, idiopathic Parkinson's disease, autosomal dominant Parkinson disease, familial, type 1 (PARK1), Parkinson disease 3, autosomal dominant Lewy body (PARK3), Parkinson disease 4, autosomal dominant Lewy body (PARK4), Parkinson disease 5 (PARK5), Parkinson disease 6, autosomal recessive early-onset (PARK6), Parkinson disease 2, autosomal recessive juvenile (PARK2), Parkinson disease 7, autosomal recessive early-onset (PARK7), Parkinson disease 8 (PARK8), Parkinson disease 9 (PARK9), Parkinson disease 10 (PARK10), Parkinson disease 11 (PARK11), Parkinson disease 12 (PARK12), Parkinson disease 13 (PARK13), or mitochondrial Parkinson's disease. In some embodiments, the neuronal disease is Alzheimer's disease, Parkinson's disease, Parkinson's dementia, autism, stroke, post-traumatic stress disorder (PTSD), traumatic brain disorder (TBD), chronic traumatic encephalopathy (CTE), schizophrenia, dementia (e.g., general dementia), attention-deficit/hyperactivity disorder (ADHD), amyotrophic lateral sclerosis (ALS), frontotemporal lobar degeneration (FTLD) (e.g., FTLD-tau, FTLD-TDP, or FTLD-FUS), memory loss (e.g., age-related memory loss), hypertensive encephalopathy, or chronic stress.

In some embodiments, the neuronal disease is Alzheimer's disease (AD). Alzheimer's disease is characterized by symptoms of memory loss in the early stages of the disease. Apoε4 carriers are at greater risk of developing AD. APOε4 is believed to be less efficient than other isoforms at clearing Aε, and thus may be correlated with greater amyloid burden, tau phosphorylation, synaptotoxicity, and reduced synaptic density. Having experienced a traumatic brain injury (TBI) is another risk factor for developing AD, and studies indicate that those who experience a TBI have a significantly increased risk of AD. Cognitive decline has been correlated with the progressive loss of synapses. As the disease advances, symptoms include confusion, long-term memory loss, paraphasia, loss of vocabulary, aggression, irritability and/or mood swings. In more advanced stages of the disease, there is loss of bodily functions. Patients with Alzheimer's Disease (AD) demonstrate many characteristic neuropathies such as increased oxidative stress, mitochondrial dysfunction, synaptic dysfunction, disruption of calcium homeostasis, deposition of senile plaques and neurofibrillary tangles, and atrophy of the brain. Without wishing to be bound by any theory, it is believed that both the cause and effect of these neuropathies is the accumulation of harmful forms of aggregated amyloid beta (Aβ) peptides in the brain. AD related disorders include senile dementia of AD type (SDAT), frontotemporal dementia (FTD), vascular dementia, mild cognitive impairment (MCI) and age-associated memory impairment (AAMI). In some embodiments, a method of treating or preventing Alzheimer's disease is provided, comprising administering to a patient in need thereof a therapeutically effective amount of a form of Compound I described herein, or a pharmaceutically acceptable salt thereof. In some embodiments, the patient is an Apoε2 or Apoε3 carrier. In some embodiments, the patient has suffered a TBI. In some embodiments, the patient is an Apoε4 carrier. In some embodiments, the patient is an Apoε4 carrier who has suffered a TBI.

In some embodiments the neuronal disease is Fragile-X syndrome (FXS). As known in the art, FXS is a genetic syndrome which has been linked to a variety of disorders (e.g., autism and inherited intellectual disability). The disability can present in a spectrum of values ranging from mild to severe. It is observed that males with FXS begin developing progressively more severe problems, typically starting after age 40, in performing tasks which require working memory. This is especially observed with respect to verbal working memory. In some embodiments, the neuronal disease is autism. As known in the art, autism is a disorder of neural development. Without wishing to be bound by any theory, it is believed that autism affects information processing in the brain by altering how nerves and synapses connect and organize.

In further embodiments, the compositions and methods are provided for alleviating, reducing, or reversing a symptom of a neuronal disease or disorder. The symptom may be any symptom described herein.

The term "memory" and the like refer, in the usual and customary sense, to the processes by which information is encoded, stored and retrieved by a subject. The terms "encode," "register" and the like in the context of memory refer, in the usual and customary sense, to receiving, processing and combining information impinging on the senses as chemical or physical stimuli. The term "stored" and the like in this context refer, in the usual and customary sense, to the creation of a record of the encoded information. The terms "retrieve," "recall" and the like in this context refer, in the usual and customary sense, to calling back the stored information. Retrieval can be in response to a cue, as known in the art. In some embodiments, memory loss refers to a diminished ability to encode, store, or retrieve information. In some embodiments, the memory may be recognition memory or recall memory. In this context, "recognition memory" refers to recollection of a previously encountered stimulus. The stimulus can be e.g., a word, a scene, a sound, a smell or the like, as known in the art. A broader class of memory is "recall memory" which entails retrieval of previously learned information, e.g., a series of actions, list of words or number, or the like, which a subject has encountered previously. Methods for assessing the level of memory encoding, storage and retrieval demonstrated by a subject are well known in the art, including methods disclosed herein. For example, in some embodiments the method improves memory in a subject in need thereof, wherein the subject has a neuronal disease. In some embodiments, the method improves memory in the subject. In some embodiments, the method treats neuronal or cognitive impairment in the subject. In some embodiments, the method treats neuronal impairment in the subject. In some embodiments, the method treats cognitive impairment in the subject.

Further to any aspect disclosed herein, in some embodiments the subject suffers from brain injury. Types of brain injury include brain damage (i.e., destruction or degeneration of brain cells), traumatic brain injury (i.e., damage accruing as the result of an external force to the brain), stroke (i.e., a vascular incident which temporarily or permanently damages the brain, e.g., via anoxia), and acquired brain injury (i.e., brain damage not present at birth). In some embodiments, the method improves memory in the subject. In some embodiments, the method improves learning in the subject. In some embodiments, the method treats neuronal or cognitive impairment in the subject. In some embodiments, the method treats neuronal impairment in the subject. In some embodiments, the method treats cognitive impairment in the subject.

In some embodiments, a method for promoting spinogenesis in a patient in need thereof is provided, comprising administering to the patient a form of Compound I described herein, or a pharmaceutically acceptable salt thereof. In some embodiments, a method of treating or preventing a neuronal disease or disorder is provided, comprising administering to a patient in need thereof a therapeutically effective amount of a form of Compound I described herein, or a pharmaceutically acceptable salt thereof. In some embodiments, a form of Compound I, or a pharmaceutically acceptable salt thereof, for use in the treatment of a neuronal disease or disorder is provided. In some embodiments, a form of Compound I, or a pharmaceutically acceptable salt thereof, for use in the manufacture of a medicament for the treatment of a neuronal disease or disorder is provided. In some embodiments, the neuronal disease or disorder is selected from Alzheimer's disease, Parkinson's disease, Parkinson's dementia, autism, fragile X syndrome, and traumatic brain injury. In some embodiments, the neuronal disease or disorder is Alzheimer's disease. In some embodiments, a form of Compound I described herein, or a pharmaceutical composition thereof, inhibits cross-linking of f-actin. In some embodiments, a form of Compound I described herein, or a pharmaceutical composition thereof, is anti-metastatic.

Combination Therapies

In one embodiment, the forms of Compound I disclosed herein may be used in combination with one or more additional therapeutic agent that are being used and/or developed to treat a neuronal disease or disorder.

When used for the treatment or prevention of the diseases and disorders described above, a form of Compound I described herein, or a pharmaceutical composition thereof, may be administered together with one or more additional therapeutic agents, for example additional therapeutic agents approved for use in the treatment or prevention of the particular disease or disorder, and more particularly agents considered to form the current standard of care. Where combination therapy is envisaged, the active agents may be administered simultaneously, separately or sequentially in one or more pharmaceutical compositions.

Recent strategies for the treatment of AD include controlling the production or the aggregation state of specific isoforms of Aβ peptides. Additional strategies include preventing, reducing or removing toxic forms of phosphorylated tau. Other strategies involve small molecule targeting of enzymes that play a role in production of Aβ peptides through processing of amyloid precursor protein in an attempt to lower the abundance of Aβ peptides in the brain. Additionally, there is accruing information on the role of non-amyloid neuropathies such as tauopathy or sporadic inheritance of specific mutations in the apolipoprotein E gene, which is stimulating additional strategies to combat neurodegeneration.

The one or more additional therapeutic agent may be tacrine, donepezil, galantamine, rivastigmine, memantine, levodopa, carbidopa, lisuride, rasagiline, tolcapone, entacapone, clozapine, desipramine, citalopram, nortriptyline, paroxetine, atomoxetine, venlafaxine, amantadine, donepezil, rivastigmine, bromocriptine, cabergoline, pergolide, pramipexole, ropinirole, rotigotine, apomorphine, benserazide, selegiline, omigapil, CEP-1347, isradipine, DOPA, lithium, riluzole, levetiracetam, ezogabine, pregabalin, rufmamide, felbamate, carbamazepine, valproate, sodium valproate, lamotrigine, phenytoin, oxcarbazepine, ethosuximide, gabapentin, tiagabine, topiramate, vigabatrin, phenobarbital, primidone, clonazepam, interferon beta-1a, interferon beta-1b, mitoxantrone, natalizumab, fmgolimod, natalizumab, teriflunomide, dimethyl fumarate, glatiramer, ATOH1 gene therapy, ozanezumab, arimoclomol, tirasemtiv, dexpramipexole, pridopidine, or galantamine; or a phosphoglycerate kinase (PGK) as described in US 2018/0147263. In some embodiments, the one or more additional therapeutic agent may be an acetyl-cholinesterase inhibitor (AChEI), for example, acotiamide, alpha-pinene, ambenonium, demecarium, DFP (diisopropylfluorophosphate), donepezil, edrophonium, galantamine, huperzine A, lactucopicrin, ladostigil, neostigmine, physostigmine, pyridostigmine, dyflos, echothiophate, rivastigmine, rosmarinic acid, tacrine, ungeremine, zanapezil, ganstigmine, phenserine, phenethylnorcymserine (PENC), cymserine, thiacymserine, SPH 1371 (galantamine plus), ER 127528, RS 1259, or F3796. In some embodiments, the one or more additional therapeutic agent may be an amyloid-clearing antibody, for example, bapineuzumab, solanezumab, gantenerumab, crenezumab, ponezumab, BAN2401, or aducanumab.

The one or more additional therapeutic agents may be a sedative-hypnotic such as chloral hydrate, estazolam, flurazepam hydrochloride, pentobarbital, pentobarbital sodium, phenobarbital sodium, secobarbital sodium, temazepam, triazolam, zaleplon, or zolpidem tartrate; an anticonvulsant such as acetazolamide sodium, carbamazepine, clonazepam, clorazepate dipotassium, diazepam, divalproex sodium, ethosuximde, fosphenytoin sodium, gabapentin, lamotrigine, magnesium sulfate, phenobarbital, phenobarbital sodium, phenytoin, phenytoin sodium, primidone, tiagabine hydrochloride, topiramate, valproate sodium, or valproic acid; an antidepressant such as amitriptyline hydrochloride, amitriptyline pamoate, amoxapine, bupropion hydrochloride, citalopram hydrobromide, clomipramine hydrochloride, desipramine hydrochloride, doxepin hydrochloride, fluoxetine hydrochloride, imipramine hydrochloride, imipramine pamoate, mirtazapine, nefazodone hydrochloride, nortriptyline hydrochloride, paroxetine hydrochloride, phenelzine sulfate, sertraline hydrochloride, tranylcypromine sulfate, trimipramine maleate, or venlafaxine hydrochloride; an antianxiety drug such as alprazolam, buspirone hydrochloride, chlordiazepoxide, chlordiazepoxide hydrochloride, clorazepate dipotassium, diazepam, doxepin hydrochloride, hydroxyzine embonate, hydroxyzine hydrochloride, hydroxyzine pamoate, lorazepam, mephrobamate, midazolam hydrochloride, or oxazepam; an antipsychotic drug such as chlorpromazine hydrochloride, clozapine, fluphenazine decanoate, fluephenazine enanthate, fluphenazine hydrochloride, haloperidol, haloperidol decanoate, haloperidol lactate, loxapine hydrochloride, loxapine succinate, mesoridazine besylate, molindone hydrochloride, olanzapine, perphenazine, pimozide, prochlorperazine, quetiapine fumarate, risperidone, thioridazine hydrochloride, thiothixene, thiothixene hydrochloride, or trifluoperazine hydrochloride; a central nervous system stimulant such as amphetamine sulfate, caffeine, dextroamphetamine sulfate, doxapram hydrochloride, methamphetamine hydrochloride, methylphenidate hydrochloride, modafinil, pemoline, or phentermine hydrochloride; an antiparkinsonian such as amantadine hydrochloride, benztropine mesylate, biperiden hydrochloride, biperiden lactate, bromocriptine mesylate, carbidopa-levodopa, entacapone, levodopa, pergolide mesylate, pramipexole dihydrochloride, ropinirole hydrochloride, selegiline hydrochloride, tolcapone, or trihexyphenidyl hydrochloride; or a central nervous system agent such as bupropion hydrochloride, donepezil hydrochloride, droperidol, fluvoxamine maleate, lithium carbonate, lithium citrate, naratriptan hydrochloride, nicotine polacrilex, nicotine transdermal system, propofol, rizatriptan benzoate, sibutramine hydrochloride monohydrate, sumatriptan succinate, tacrine hydrochloride, or zolmitriptan; a cholinergic (e.g., parasymathomimetic) such as bethanechol chloride, edrophonium chloride, neostigmine bromide, neostigmine methylsulfate, physostigmine salicylate, or pyridostigmine bromide; an anticholinergic such as atropine sulfate, dicyclomine hydrochloride, glycopyrrolate, hyoscyamine, hyoscyamine sulfate, propantheline bromide, scopolamine, scopolamine butylbromide, or scopolamine hydrobromide; an adrenergic (sympathomimetics) such as dobutamine hydrochloride, dopamine hydrochloride, metaraminol bitartrate, norepinephrine bitartrate, phenylephrine hydrochloride, pseudoephedrine hydrochloride, or pseudoephedrine sulfate; an adrenergic blocker (sympatholytic) such as dihydroergotamine mesylate, ergotamine tartrate, methysergide maleate, or propranolol hydrochloride; a skeletal muscle relaxant such as baclofen, carisoprodol, chlorzoxazone, cyclobenzaprine hydrochloride, dantrolene sodium, methocarbamol, or tizanidine hydrochloride; a neuromuscular blocker such as atracurium besylate, cisatracurium besylate, doxacurium chloride, mivacurium chloride, pancuronium bromide, pipecuronium bromide, rapacuronium bromide, rocuronium bromide, succinylcholine chloride, tubocurarine chloride, or vecuronium bromide; or a corticosteroid such as betamethasone, betamethasone acetate or betamethasone sodium phosphate, betamethasone sodium phosphate, cortisone acetate, dexamethasone, dexamethasone acetate, dexamethasone sodium phosphate, fludrocortisone acetate, hydrocortisone, hydrocortisone acetate, hydrocortisone cypionate, hydrocortisone sodium phosphate, hydrocortisone sodium succinate, methylprednisolone, methylprednisolone acetate, methylprednisolone sodium succinate, prednisolone, prednisolone acetate, prednisolone sodium phosphate, prednisolone tebutate, prednisone, triamcinolone, triamcinolone acetonide, or triamcinolone diacetate.

Kits

Provided herein are also kits that include a form of Compound I described herein, or a pharmaceutical composition thereof, optionally a second active agent, and suitable packaging. In one embodiment, a kit further includes instructions for use. In one aspect, a kit includes a form of Compound I described herein, or a pharmaceutical composition thereof, and a label and/or instructions for use of the pharmaceutical composition in the treatment of the indications, including the diseases or conditions, described herein.

Provided herein are also articles of manufacture that include a form of Compound I described herein, or a pharmaceutical composition thereof, in a suitable container. The container may be a vial, jar, ampoule, preloaded syringe, nebulizer, aerosol dispensing device, dropper, or intravenous bag.

Synthesis

In some embodiments, the disclosure provides processes for synthesizing Compound I.

The present processes may be performed using methods disclosed herein and routine modifications thereof which will be apparent given the disclosure herein and methods known in the art. Conventional and well-known synthetic methods may be used in addition to the teachings herein. The synthesis of typical compounds described herein, e.g. Compound I, Compound A, etc., or other formulas or compounds disclosed herein may be accomplished as described in the following examples. If available, reagents may be purchased commercially, e.g. from Sigma Aldrich or other chemical suppliers.

Typical embodiments of compounds in accordance with the present disclosure may be synthesized using the general reaction schemes described below. A given reagent may be defined as a general class or category (e.g., functional or structural), which should be construed to include any reagent matching the given descriptor.

The compounds of this disclosure can be prepared from readily available starting materials using, for example, the following general methods and procedures. It will be appreciated that where typical or preferred process conditions (i.e., reaction temperatures, times, mole ratios of reactants, solvents, pressures, etc.) are given, other process conditions can also be used unless otherwise stated. Optimum reaction conditions may vary with the particular reactants or solvent used, but such conditions can be determined by one skilled in the art by routine optimization procedures.

Additionally, as will be apparent to those skilled in the art, conventional protecting groups may be described herein. Suitable protecting groups for various functional groups as well as suitable conditions for protecting and deprotecting particular functional groups are known in the art. For example, numerous protecting groups are described in T. W. Greene and G. M. Wuts (1999) *Protecting Groups in Organic Synthesis,* 3rd Edition, Wiley, New York, and references cited therein.

The starting materials for the following reactions are generally known compounds or can be prepared by known procedures or obvious modifications thereof. For example, many of the starting materials are available from commercial suppliers such as Aldrich Chemical Co. (Milwaukee, Wisconsin, USA), Bachem (Torrance, California, USA), Emka-Chemce or Sigma (St. Louis, Missouri, USA). Others may be prepared by procedures or obvious modifications thereof, described in standard reference texts such as Fieser and Fieser's Reagents for Organic Synthesis, Volumes 1-15 (John Wiley, and Sons, 1991), Rodd's Chemistry of Carbon Compounds, Volumes 1-5, and Supplementals (Elsevier Science Publishers, 1989) organic Reactions, Volumes 1-40 (John Wiley, and Sons, 1991), March's Advanced Organic Chemistry, (John Wiley, and Sons, 5$^{th}$ Edition, 2001), and Larock's Comprehensive Organic Transformations (VCH Publishers Inc., 1989).

The terms "inert organic solvent" or "inert solvent" refer to a solvent inert under the conditions of the reaction being described in conjunction therewith (including, for example, benzene, toluene, acetonitrile, tetrahydrofuran ("THF"), dimethylformamide ("DMF"), chloroform, methylene chloride (or dichloromethane), diethyl ether, methanol, pyridine, acetic acid and the like). Unless specified to the contrary, the reactions are carried out under an inert gas, such as nitrogen or argon. A "solvent" need not be inert.

In each of the exemplary schemes it may be advantageous to separate reaction products from one another and/or from starting materials. The desired products of each step or series of steps is separated and/or purified (hereinafter separated) to the desired degree of homogeneity by the techniques common in the art. Typically such separations involve multiphase extraction, crystallization from a solvent or solvent mixture, distillation, sublimation, or chromatography. Chromatography can involve any number of methods including, for example: reverse-phase and normal phase; size exclusion; ion exchange; high, medium, and low pressure liquid chromatography methods and apparatus; small scale analytical; simulated moving bed (SMB) and preparative thin or thick layer chromatography, as well as techniques of small scale thin layer and flash chromatography.

Another class of separation methods involves treatment of a mixture with a medium selected to bind to or render otherwise separable a desired product, unreacted starting material, reaction by product, or the like. Such media include adsorbents or absorbents such as activated carbon, molecular sieves, ion exchange media, or the like. Alternatively, an acid (in the case of a basic material) or a base (in the case of an acidic material), a binding reagent such as an antibody, a binding protein, a selective chelator such as a crown ether, a liquid/liquid ion extraction reagent (LIX), or the like.

Selection of appropriate methods of separation depends on the nature of the materials involved. For example, boiling point and molecular weight in distillation and sublimation, presence or absence of polar functional groups in chromatography, stability of materials in acidic and basic media in multiphase extraction, and the like. One skilled in the art will apply techniques most likely to achieve the desired separation.

Starting material and reagents were purchased from Energy Chemical Shanghai Titan Scientific Co., Ltd. These materials were used without further purification. Oxygen- and moisture-sensitive reactions were carried out under nitrogen atmosphere. Reactions were monitored by thin-layer chromatography (TLC), and thin layer chromatography plates were visualized by exposure to ultraviolet light. The elution was monitored at 254 nm. Flash column chromatography was generally performed on silica gel (300-400 mesh). Yields refer to isolated chromatographically and spectroscopically homogeneous materials, unless otherwise stated.

Scheme 1 represents an exemplary synthesis of Compound I and can be carried out according to the embodiments described herein. It is contemplated that the exemplary synthesis shown in Scheme 1 may be particularly advantageous. For example, the synthesis avoids toxic reagents. The synthesis also can utilize milder reaction conditions, and can require fewer purification steps (e.g. avoid column chromatography). The synthesis may also provide higher yield(s). The particular reaction conditions and reagents employed in Scheme 1 are discussed below.

Compound I can be synthesized following the general scheme, Scheme 1:

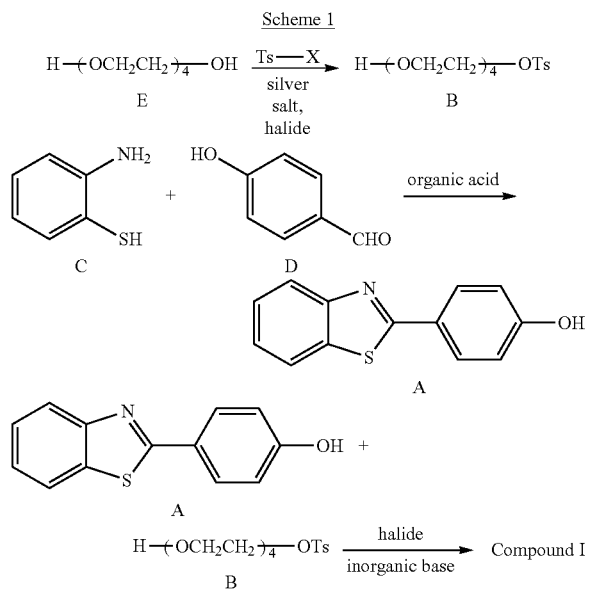

In some embodiments, a process for preparing Compound I, or a pharmaceutically acceptable salt thereof is provided:

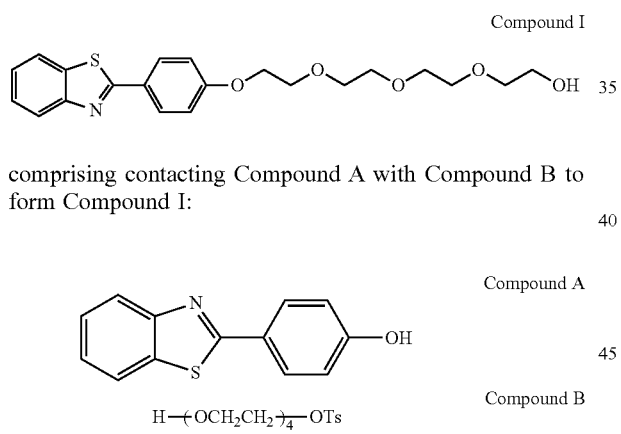

comprising contacting Compound A with Compound B to form Compound I:

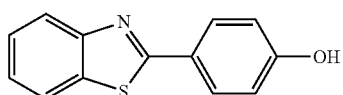

under first reaction conditions comprising a halide.

In some embodiments of the process for preparing Compound I the halide is an alkali metal halide. In some embodiments of the process for preparing Compound I, the alkali metal halide is an alkali metal iodide. In some embodiments of the process for preparing Compound I, the alkali metal iodide is potassium iodide. In some embodiments of the process for preparing Compound I, the first reaction conditions further comprise an inorganic base. In some embodiments of the process for preparing Compound I, the inorganic base is potassium carbonate. In some embodiments of the process for preparing Compound I, the first reaction conditions comprise a temperature of 65 to 120° C.

In some embodiments, a process for preparing Compound A, and optionally Compound I, comprises contacting Compound C with Compound D to form Compound A:

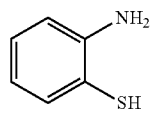

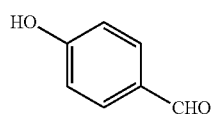

under second reaction conditions comprising a protic acid.

In some embodiments of the process for preparing Compound I, the protic acid is an organic acid. In some embodiments of the process for preparing Compound I, the organic acid is acetic acid. In some embodiments of the process for preparing Compound I, the protic acid is present in a greater than stoichiometric mole ratio relative to both Compound C and Compound D. In some embodiments of the process for preparing Compound I, the protic acid dissolves Compound C and Compound D. In some embodiments of the process for preparing Compound I, acetic acid is a non-inert solvent.

In some embodiments, a process for preparing Compound B, and optionally Compound I, comprises contacting Compound E with p-toluenesulfonyl chloride to form Compound B:

under third reaction conditions comprising a silver salt.

In some embodiments of the process for preparing Compound I, the silver salt is $Ag_2O$. In some embodiments of the process for preparing Compound I, the third reaction conditions further comprise an alkali metal iodide. In some embodiments of the process for preparing Compound I, the alkali metal iodide is potassium iodide.

EXAMPLES

Example 1

Experimental Procedures

Compound I was subjected to various crystallization conditions, including solid vapor diffusion, anti-solvent addition, liquid vapor diffusion, slow cooling, slurry conversion at various temperatures, temperature cycling, and slow evaporation. Crystalline forms of Compound I were analyzed by X-ray powder diffraction (XRPD), differential scanning calorimetry (DSC) and thermogravimetric analysis (TGA), while metastable forms were analyzed by XRPD. XRPD was performed with a Panalytical X'Pert3 Powder XRPD with a Si zero-background holder. The 2θ position was calibrated against a Panalytical Si reference standard disc. Instrumental parameters used are listed in Table 1-1.

TABLE 1-1

| Parameters for XRPD analysis | |
|---|---|
| Parameters | Reflection Mode |
| X-Ray wavelength | Cu, kα |
| | Kα1 (Å): 1.540598, |
| | Kα2 (Å): 1.544426, |
| | Kα2/Kα1 intensity ratio: 0.50 |
| X-Ray tube setting | 45 kV, 40 mA |
| Divergence slit | Fixed 1/8° |
| Scan mode | Continuous |
| Scan range (° 2θ) | 3-40 |
| Scan step time [s] | 18.87 |
| Step size (° 2θ) | 0.0131 |
| Test Time | 4 min 15 s |

TGA data were collected using a TA Q500 and Q550 from TA Instruments. DSC was performed using a TA Q2000 from TA Instruments. DSC was calibrated with Indium reference standard and the TGA was calibrated using nickel reference standard. Detailed parameters used in the TGA and DSC tests are listed in Table 1-2.

TABLE 1-2

| Parameters for TGA and DSC tests | | |
|---|---|---|
| Parameters | TGA | DSC |
| Method | Ramp | Ramp |
| Sample pan | Platinum, open | Aluminum, crimped |
| Temperature | RT-desired temperature | 25° C.-desired temperature |
| Heating rate | 10° C./min | 10° C./min |
| Purge gas | $N_2$ | $N_2$ |

PLM images were captured using Zeiss Axio Scope.A1 microscope. The PLM images of obtained samples in the single crystal growth experiments were captured using Shanghai Cewei PXS9-T stereo microscope at RT.

DVS was measured via a SMS (Surface Measurement Systems) DVS Intrinsic. The relative humidity at 25° C. were calibrated against deliquescence point of LiCl, Mg(NO3)2 and KCl. Actual parameters for DVS test are listed in Table 1-3.

TABLE 1-3

| Parameters for DVS test | |
|---|---|
| Parameters | Values |
| Temperature | 25° C. |
| Sample size | 10-20 mg |
| Gas and flow rate | $N_2$, 200 mL/min |
| dm/dt | 0.002%/min |
| Min. dm/dtstability duration | 10 min |
| Max. equilibrium time | 180 min |
| RH range | 0% RH-95% RH-0% RH |
| RH step size | 10% (0% RH-90% RH and 90% RH-0% RH) |
| | 5% (90% RH-95% RH-90% RH) |

Agilent 1260 HPLC with VWD detector was utilized and detailed chromatographic conditions for purity analysis are listed ill Table 1-4.

TABLE 1-4

| HPLC conditions and parameters | | |
|---|---|---|
| Items | Conditions | |
| HPLC | Agilent 1260 with VWD detector | |
| Column | Waters Xbridge C18, 150 × 4.6 mm, 5 μm | |
| Mobile phase | A: 0.1% TFA in $H_2O$ | |
| | B: 0.1% TFA in acetonitrile | |
| Gradient table | Time (min) | % B |
| | 0.0 | 10 |
| | 15.0 | 95 |
| | 18.0 | 95 |
| | 18.1 | 10 |
| | 21.0 | 10 |
| Run time | 21.0 min | |
| Post time | 0.0 min | |
| Flow rate | 1.0 mL/min | |
| Injection volume | 5 μL | |
| Detector wavelength | UV at 254 nm | |
| Column temperature | 40° C. | |
| Sampler temperature | RT | |
| Diluent | ACN | |

A total of five crystal forms were observed for Compound I, including one anhydrous form (Form I), one hydrate/solvate (Form IV), and three metastable forms (Forms II, III, and V). Forms II and III only existed in the wet state and no solid was isolated for thermal analyses. Form V solids were obtained, however, Form V changed to Form I at around 50° C. upon drying in a vacuum oven. A summary of isolated forms and conditions is in Table 1-5 and Table 1-6.

TABLE 1-5

| Conditions for isolation of forms of Compound 1 | |
|---|---|
| Method | Result |
| Solid vapor diffusion | Form I and Form V |
| Anti-solvent addition | Forms I, II, II, IV, and V, amorphous |
| Liquid vapor diffusion | Form I and Form V |
| Slow cooling | Forms I, II, and V, amorphous |
| Slurry conversion | Form I and Form V |
| Temperature cycling | Form I and Form V |
| Slow evaporation | Form I and Form III |

TABLE 1-6

| Compound I forms isolated and brief description | | | |
|---|---|---|---|
| Crystal Form | Weight Loss (%) | Endotherm (peak, ° C.) | Description |
| Form I | negligible | 70.3 | anhydrate |
| Form II | NA[1] | NA[1] | metastable |
| Form III | NA[2] | NA[2] | metastable |
| Form IV | 4.4 | 48.0, 58.9 | solvate/hydrate |
| Form V | 6.6 | 45.7 (transition), 70.2 | metastable |

Example 2

Forms of Compound I
Compound I Form I
Compound I Form I is an anhydrous form of Compound I, and it is contemplated to be the most thermodynamically stable polymorph of Compound. To date, Form I is the only stable anhydrate form identified for Compound I.

Compound I Form I was obtained through various methods. XRPD result in FIG. 1 showed that Form I was crystalline. TGA/DSC curves (FIG. 2 and FIG. 3) showed negligible weight loss and one endothermic peak at 70.3° C. Form I was considered to be anhydrate based on these characterization data.

Compound I Form I was isolated using methods provided herein.

Compound I Form II

Form II was obtained through various methods. XRPD result showed that Form II was crystalline. It only existed as a wet cake and changed to a mixture of Form II and C or a mixture of Form III and Form V upon storage. To further investigate Form II, several attempts for re-preparation were made and resulted in the formation of Forms III, IV, V, or amorphous forms, indicating Form II was a metastable form. Thus, no DSC and TGA data of Form II was obtained.

Compound I Form III

Form III was obtained through various methods. XRPD results showed that Form III was crystalline. Form III solids obtained through slow evaporation in MeOH quickly converted to Form I upon exposure to open air during XRPD analyses. To further investigate Form III, several attempts for re-preparation were made and resulted in the formation of Form I or amorphous forms, indicating Form III was a metastable form. Thus, no DSC and TGA data of Form III was obtained.

Compound I Form IV

Form IV was obtained by anti-solvent addition of $H_2O$ in MEK stock solutions. XRPD result showed that Form IV was crystalline. TGA/DSC curves showed a weight loss of 4.4% up to 150° C., and two endothermic peaks at 48.0 and 58.9° C. Form IV was considered to be a hydrate or solvate based on these characterization data.

Compound I Form V

Form V was obtained through various methods. XRPD result showed that Form V was crystalline. TGA/DSC curves showed a weight loss of 6.6% up to 150° C., and two thermal events at 45.7° C. (transition, onset) and 70.2° C. (melting, peak). XRPD data also showed that Form V solids converted to Form I upon vacuum drying at ~50° C. Compound I Form V converted to Compound I Form I with dehydration/desolvation at ~50° C. These results indicated Form V is a metastable hydrate/solvate that converted to Form I upon dehydration/desolvation.

Amorphous Compound I

Amorphous Compound I was observed under the conditions described herein.

Example 3

Processes for Forms of Compound I

Solubility

Approximate solubility of Compound I was determined in 20 single solvents at RT. Approximately 2 mg of powder sample was added into a 3-mL glass vial. Corresponding solvents were added stepwise (50 μL→100 μL→300 μL→1000 μL) into each vial until powder solids were completely dissolved visually or a total volume of 1 mL solvent was added. Approximate solubility values were calculated based on sample mass, solvent volume, and experimental observation. Results summarized in Table 3-1 were used to guide subsequent solvent selection in the design of polymorph screening experiments.

TABLE 3-1

Solubility of Compound I at room temperature; *indicates that samples precipitated out from clear solution (S < 40 mg/mL) after placing at RT for ~10 mins, and additional solvents were added to completely dissolve the remaining solids

| Solvent | Solubility (mg/mL) | Solvent | Solubility (mg/mL) |
| --- | --- | --- | --- |
| DMF | S > 44 | EtOH | 22 > S > 7.3* |
| DCM | S > 38 | Acetone | 18 > S > 6* |
| THF | S > 36 | Toluene | 18 > S > 6* |
| 1,4-dioxane | S > 32 | MIBK | 8.3 > S > 2.5* |
| MeOH | 42 > S > 21* | IPAc | 5.7 > S > 1.7* |
| EtOAc | 40 > S > 20* | CPME | S < 2.6* |
| 2-MeTHF | 40 > S > 20* | Heptane | S < 2.2* |
| MEK | 36 > S > 18* | MTBE | S < 2* |
| DMSO | 36 > S > 18* | $H_2O$ | S < 1.8* |
| Acetonitrile | 24 > S > 8* | IPA | S < 1.9* |

Solid Vapor Diffusion

Solid vapor diffusion experiments were conducted using 9 different solvents. Approximately 15 mg of starting material was weighed into a 4-mL vial, which was placed in a 20-mL vial with 3 mL of volatile solvent. The 20-mL vial was then sealed with a cap and kept at RT for 7 days allowing solvent vapor to interact with the sample. If solids were completely dissolved in the solvent, slow evaporation was conducted at RT. The solids obtained were analyzed by XRPD. Results summarized in Table 3-2 indicated Form I and Form V were observed.

TABLE 3-2

Summary of solid vapor diffusion experiments for Compound I; *indicates that powder solids were completely dissolved in the solvent, and thus slow evaporation was performed to obtain solid samples

| Solvent | Solid Form |
| --- | --- |
| acetone | Form I* |
| THF | Form I* |
| EtOH | Form I + Form V |
| $H_2O$ | Form I |
| EtOAc | Form I |
| dioxane | Form I* |
| toluene | Form I |
| DCM | Form I* |
| acetonitrile | Form I |

Anti-Solvent Addition

Anti-solvent addition experiments were conducted under 12 conditions. Approximately 20 mg of starting material was dissolved in 0.5 or 1.0 mL solvent to obtain a clear solution. The solution was then filtered, magnetically stirred with the addition of anti-solvent at a rate of 0.2 mL per step. Antisolvent was added until no more solids precipitated out or the total solvent volume reached 5.0 mL. If the solution remained clear, the sample was then stirred at 5° C. to induce precipitation. If no precipitation occurred at 5° C., slow evaporation was then conducted at RT to obtain solids. Solid precipitates were isolated by centrifugation for subsequent XRPD analysis. Results in Table 3-3 showed that Forms I, II, III, IV, and V, and amorphous forms were observed.

TABLE 3-3

Summary of anti-solvent addition experiments for Compound I; *indicates that solid was obtained via slow evaporation at RT

| Solvent | Anti-solvent | Solid Form |
|---|---|---|
| THF | IPA | Form I* |
|  | H$_2$O | Form II |
|  |  | Form II + Form III[1] |
|  |  | Form V[2] |
|  |  | Form IV[3] |
| MeOH | MTBE | Form I + Form V* |
| DCM | CPME | Form I* |
|  | heptane | Form I |
| DMSO | MTBE | Gel, amorphous* |
| dioxane | H$_2$O | Form III |
|  |  | Form II + Form III[1] |
|  |  | amorphous[2] |
| EtOAc | heptane | Form I |
|  | IPA | Form I* |
| MEK | H$_2$O | Form IV |
|  |  | Form IV[1] |
| DMF | CPME | Liquid* |
|  | H$_2$O | Form II |
|  |  | Form III + Form V[1] |
|  |  | amorphous[2], Form IV[4] |
|  |  | amorphous[3] |

[1]samples were left in the solvent mixture and re-analyzed on the 3$^{rd}$ day;
[2]samples were prepared and analyzed immediately on a 2$^{nd}$ attempt;
[3]samples were prepared and analyzed immediately on a 3$^{rd}$ attempt;
[4]samples were left in the solvent mixture and re-analyzed on the 2$^{nd}$ day of the 2$^{nd}$ attempt Liquid Vapor Diffusion Liquid vapor diffusion experiments were conducted under 6 conditions. Briefly, about 20 mg of starting material was dissolved in 1 mL solvent and filtered to a 5-mL vial using a PTFE syringe filter with a pore size of 0.45 m. Filtrates were then placed into a 20-mL vial with 3 mL of volatile solvents. The 20-mL vial was sealed with a cap and kept at RT to allow organic solvent vapor to interact with the solution for at least 14 days. The precipitates were then isolated for XRPD analysis. Results summarized in Table 3-4 showed that Form I and Form II were observed.

TABLE 3-4

Summary of liquid vapor diffusion experiments for Compound I

| Solvent | Anti-solvent | Solid Form |
|---|---|---|
| MEK | MTBE | No precipitation |
| DMSO | CPME | No precipitation |
| dioxane | MTBE | No precipitation |
| EtOAc | IPA | Form I + Form V |
| EtOH | H$_2$O | Form I + Form V |
| 2-MeTHF | IPA | Form I + Form V |

Slow Cooling

Slow cooling experiments were conducted in 7 solvents or solvent combinations. Briefly, about 20 mg of starting material was dissolved in 0.5 or 1 mL of solvent at 50° C. and filtered to a new vial using a PTFE syringe filter with a pore size of 0.45 m. Filtrates were slowly cooled down from 50° C. to 5° C. at a rate of 0.1° C./min. The obtained solids were kept isothermal at 5° C. before centrifugation and XRPD analysis. If the solution remained clear, slow evaporation was conducted to obtain solids for XRPD analysis. Results are summarized in Table 3-5. The results showed that Forms I, III, V, and amorphous forms were observed.

TABLE 3-5

Summary of slow cooling experiments for Compound I; *indicates that the solution remained clear after cooling and therefore slow evaporation was performed

| Solvent (v/v) | Solid Form |
|---|---|
| MeOH | Form III*[1] |
| MEK | Form I* |
| dioxane:toluene, 1:1 | Form I* |
| EtOAc:acetonitrile, 1:1 | Form I* |
| DCM:IPA, 4:1 | Form I + Form V* |
| THF:heptane, 4:1 | Form I* |
| DMSO:CPME, 4:1 | Gel, amorphous* |

[1]changed to Form I upon drying

Slurry Conversion

Slurry conversion experiments were conducted at RT or 60° C. in 17 solvent systems. Approximately 20 mg of starting material was suspended in 0.35 mL of solvent at target temperatures for 7 days. The remaining solids were isolated for XRPD analysis. If the sample was completely dissolved, additional solids were added until a total of approximately 100 mg powder solids were added. Solids were then isolated via centrifugation and analyzed with XRPD. Results summarized in Table 3-6 indicated that Form I and Form V were observed.

TABLE 3-6

Summary of slurry conversion experiments for Compound I

| Solvent | Temperature | Solid Form |
|---|---|---|
| EtOH[1] | RT | Form I |
| EtOH/H$_2$O, a$_w$ = 0.2[1] |  | Form I |
| EtOH/H$_2$O, a$_w$ = 0.4[1] |  | Form I |
| EtOH/H$_2$O, a$_w$ = 0.6[2] |  | Form I + Form V |
| EtOH/H$_2$O, a$_w$ = 0.8[2] |  | Form I + Form V |
| H$_2$O |  | Form I + Form V |
| EtOAc |  | Form I |
| 2-MeTHF[1] |  | Form I |
| Acetone[1] |  | Form I |
| Toluene |  | Form I |
| Heptane | 60° C. | Form I |
| MIBK[1] |  | Form I |
| Acetonitrile[2] |  | Form I |
| CPME[1] |  | Form I |
| IPAc[1] |  | Form I |
| MTBE |  | Form I |
| IPA[2] |  | Form I |

[1]additional solids were added (≤100 mg);
[2]the solution remained clear after the addition of ~100 mg solids, after 7 days, the solution was kept at 5° C. to obtain solids for analysis Temperature Cycling Temperature cycling experiments were conducted under 6 conditions. Briefly, about 20 mg of starting material was dissolved in 0.35 mL of solvent and magnetically stirred. The suspension was kept at 50° C. for 2 hours, cooled to 5° C. at a rate of 0.05° C./min, kept at 5° C. for 2 hours, then raised to 50° C. at a rate of 3° C./min, isothermal for 2 hours, and then cooled to 5° C. at a rate of 0.05° C./min. The samples were kept at 5° C. prior to centrifugation. Results are summarized in Table 3-7. Form I and Form V were formed.

TABLE 3-7

Summary of temperature cycling
experiments for Compound I

| Solvent (v/v) | Solid Form |
| --- | --- |
| EtOAc:CPME, 1:4 | Form I |
| THF:MTBE, 1:4 | Form I |
| EtOH:n-heptane, 1:2 | Form I |
| DCM:MTBE, 1:2 | Form I |
| DMSO:H$_2$O 1:4 | Form V* |
| MeOH:IPA, 1:4 | Form I |

*changed to Form I upon drying

Slow Evaporation

Slow evaporation experiments were conducted under 7 conditions. Approximately 20 mg of starting material was dissolved in 0.5 or 1.0 mL of solvent and filtered using a PTFE syringe filter with a pore size of 0.45 μm. Filtrates were then covered using Parafilm© with 3 pinholes and stored at RT. The resultant solids were collected for XRPD analysis. Results are summarized in Table 3-8. It is shown that Form I and Form III crystal forms were observed.

TABLE 3-8

Summary of slow evaporation experiments
for Compound I; *indicates that the
solution remained clear after cooling and
therefore slow evaporation was performed

| Solvent (v/v) | Solid Form |
| --- | --- |
| THF | Form I* |
| DCM | Form III + extra peak*[1] |
| MeOH | Form III*[1] |
| EtOAc | Form I |
| MEK | Form I* |
| acetonitrile | Form I |
| 1,4-dioxane:H$_2$O, 9:1 | Form I* |

[1]converted to Form I upon drying

Example 4

Solid State Stability of Compound I

The solid state stability of Compound I was evaluated under conditions of 30° C./65% RH (open dish and closed container) and 40° C./75% RH (open dish and closed container) for 4 weeks. The detailed procedures utilized for stability evaluation are listed: 1) Weighed about 10 mg of Compound I starting material into 3-mL glass vials; 2) For the open dish conditions, covered the vials with Parafilm® and poked 6 holes. For the closed conditions, sealed the vials with caps and kept the vials in the corresponding conditions, respectively; For the condition of 40° C./75% RH, placed the vials in the stability chamber of 40° C./75% RH; For the condition of 30° C./65% RH, placed the vials in the airtight atmosphere generated by saturated aqueous potassium iodide solution in 30° C. bio-chemical; 4) Samples taken for XRPD, PLM, and HPLC purity after 3 days, 1 week, 2 weeks and 4 weeks.

Based on the XRPD results, no form change was observed after storage under all above conditions. PLM characterization result showed the Compound I sample were still irregular thin plate-like crystals with agglomeration. HPLC analysis showed no significant HPLC purity decrease was observed after 4 weeks under conditions of 30° C./65% RH (open and closed) and 40° C./75% RH (open and closed).

Solid state stability evaluation of Compound I Form I starting material was performed under conditions of 30° C./65% RH (closed and open) and 40° C./75% RH (closed and open). X-ray powder diffraction (XRPD), polarizing microscope (PLM) and HPLC purity were characterized at 4 sampling points (3 days, 1 week, 2 weeks, 4 weeks). No form change and significant HPLC purity decrease were observed for the Compound I Form I under both conditions of 30° C./65% RH and 40° C./75% RH for 4 weeks. The solid state stability evaluation results were summarized in Table 4-1.

For the single crystal structure determination, 83 single crystal growth experiments were performed by different methods including slow evaporation, liquid vapor diffusion, slow cooling, heating-cooling and solvent-thermal synthesis. The stability evaluation experiments in 40° C./75% RH condition were performed using stability chamber, while the 30° C./65% RH condition was set up by saturated aqueous potassium iodide solution in 30° C. bio-chemical incubator.

TABLE 4-1

Summary of solid state stability evaluation for Compound I Form I (purity by HPLC)

| Storage Condition | Package | Sampling Point | Initial (Area %) | Purity (Area %) | Purity/Initial (%) | Form Change |
| --- | --- | --- | --- | --- | --- | --- |
| 30° C./ 65% RH | Open dish | 3 days | 99.66 | 99.69 | 100.0 | No |
| | | 1 week | | 99.66 | 100.0 | No |
| | | 2 weeks | | 99.63 | 100.0 | No |
| | | 4 weeks | | 99.66 | 100.0 | No |
| 30° C./ 65% RH | Closed container | 3 days | 99.66 | 99.68 | 100.0 | No |
| | | 1 week | | 99.66 | 100.0 | No |
| | | 2 weeks | | 99.64 | 100.0 | No |
| | | 4 weeks | | 99.66 | 100.0 | No |
| 40° C./ 75% RH | Open dish | 3 days | 99.66 | 99.61 | 99.9 | No |
| | | 1 week | | 99.66 | 100.0 | No |
| | | 2 weeks | | 99.63 | 100.0 | No |
| | | 4 weeks | | 99.65 | 100.0 | No |
| 40° C./ 75% RH | Closed container | 3 days | 99.66 | 99.76 | 100.1 | No |
| | | 1 week | | 99.66 | 100.0 | No |
| | | 2 weeks | | 99.45 | 99.8 | No |
| | | 4 weeks | | 99.65 | 100.0 | No |

Compound I starting material was the delivered sample. The starting material was characterized by XRPD, thermogravimetric analysis (TGA), differential scanning calorimetry (DSC), PLM and dynamic vapor sorption (DVS).

Figure 12:
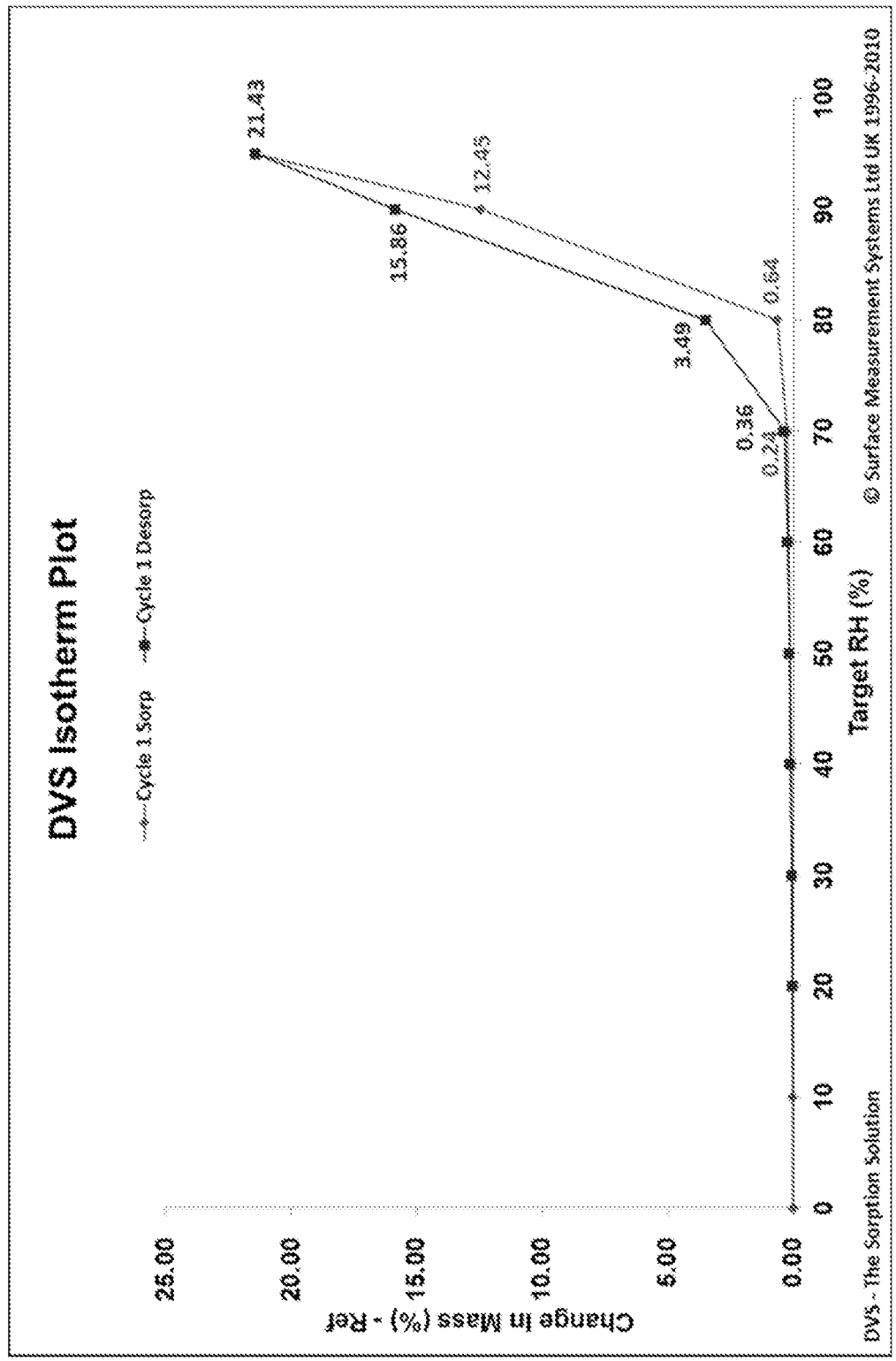
FIG. 12 shows a DVS plot of Compound I starting material.
Figure 13:
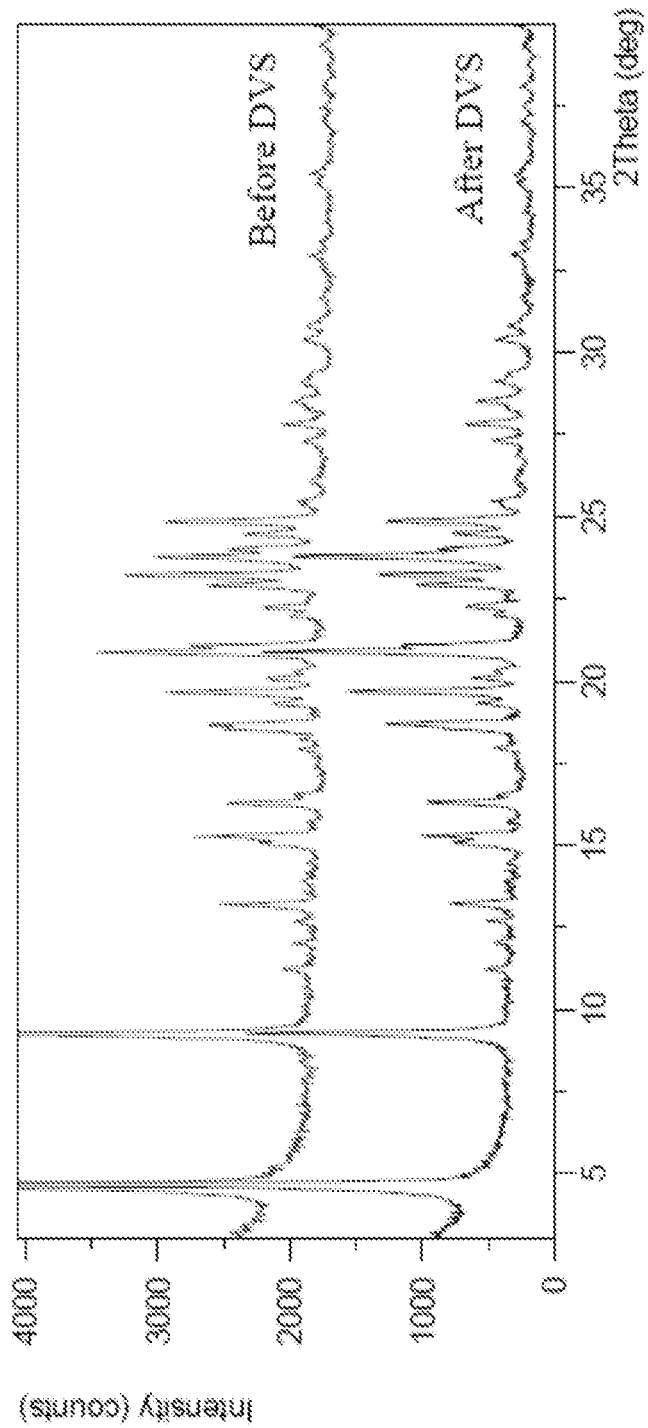
FIG. 13 shows XRPD overlay of Compound I starting material before and after DVS test.
Figure 14:
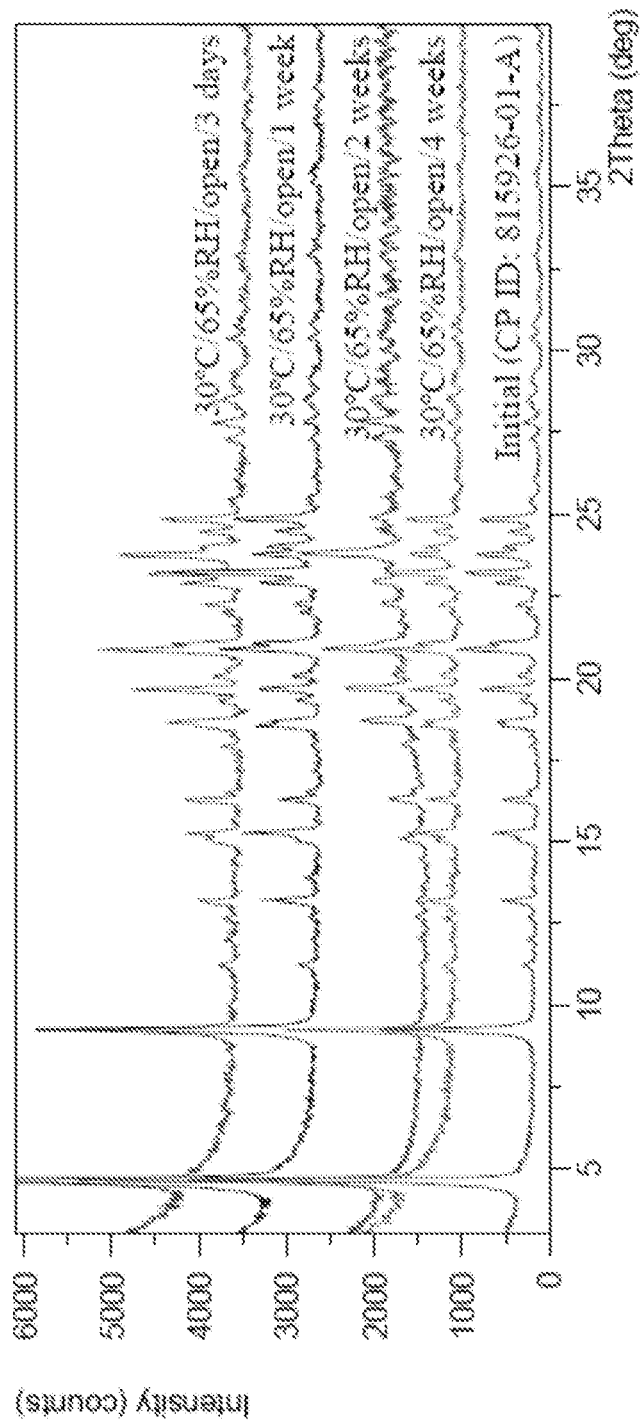
FIG. 14 shows XRPD overlay of Compound I after storage under condition of 30° C./65% RH/open.
Figure 15:
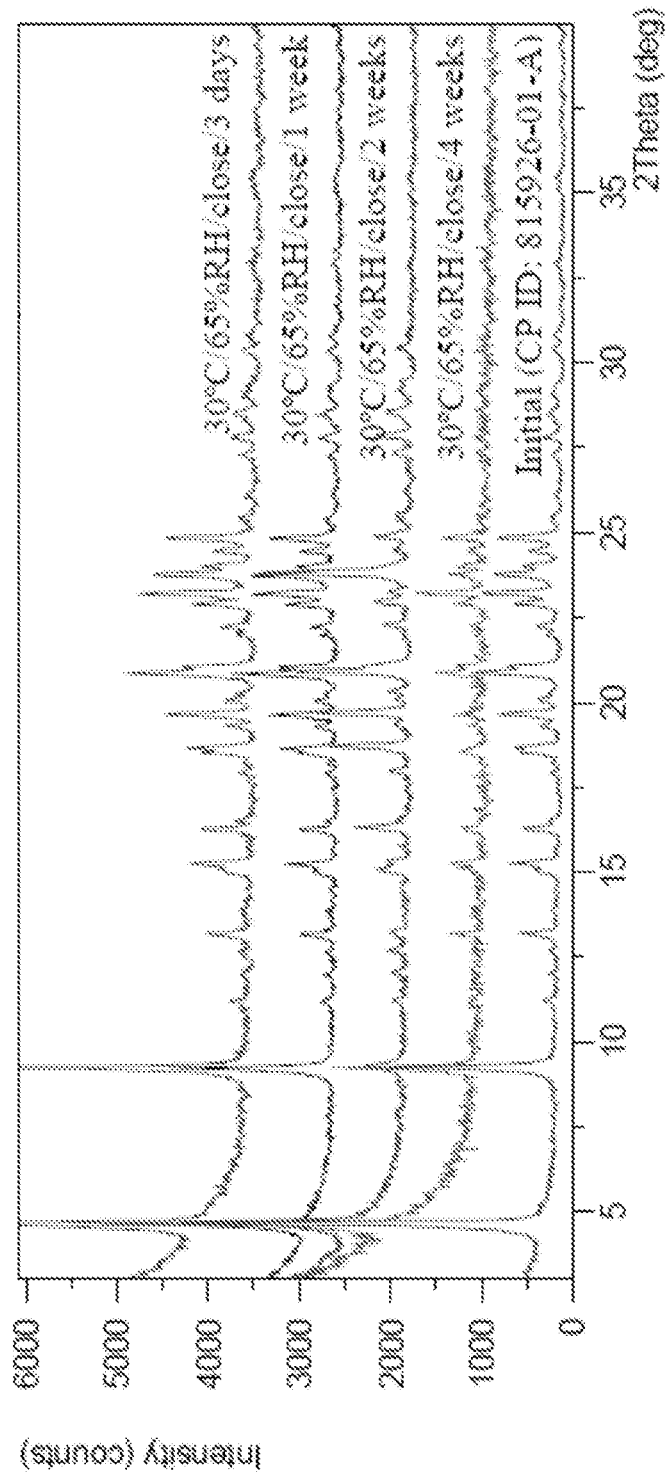
FIG. 15 shows XRPD overlay of Compound I after storage under condition of 30° C./65% RH/closed.
Figure 16:
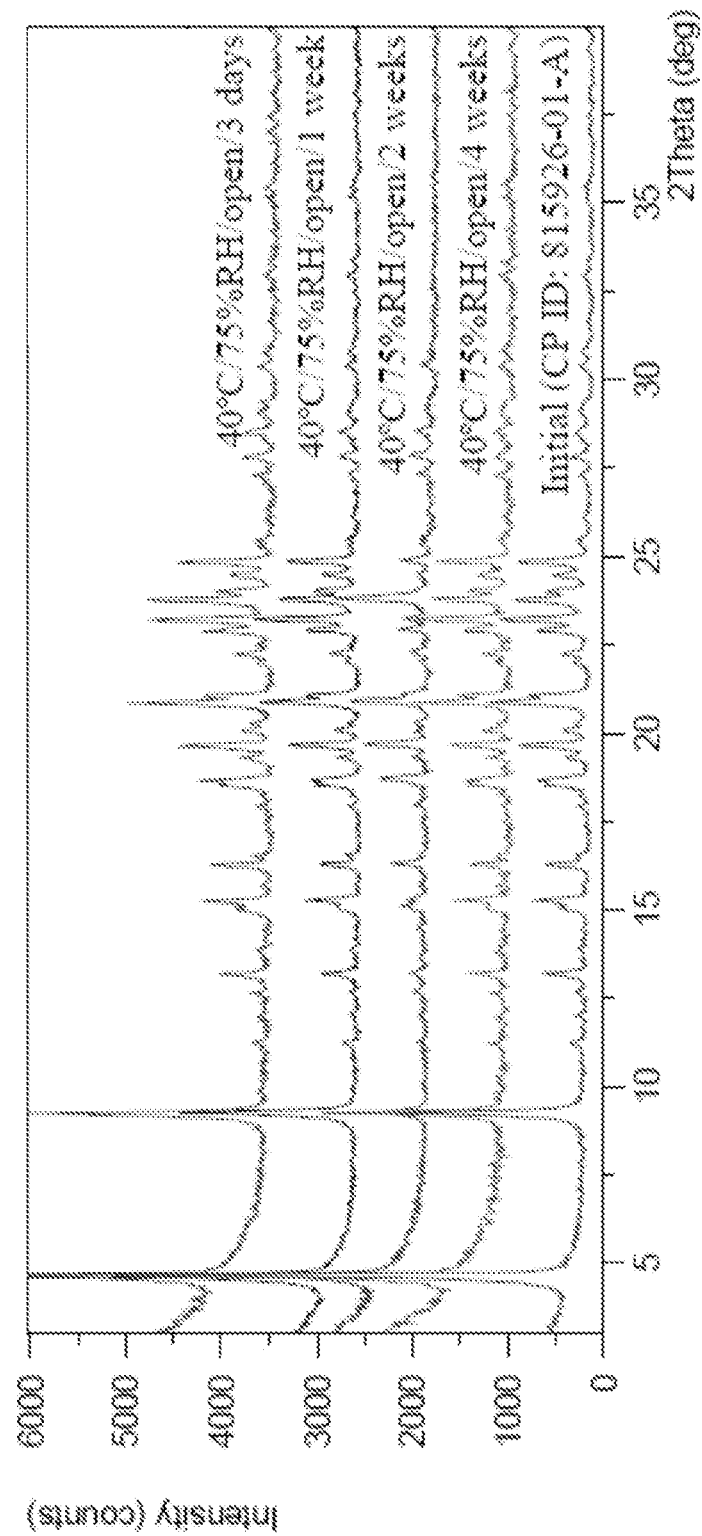
FIG. 16 shows XRPD overlay of Compound I after storage under condition of 40° C./75% RH/open.
Figure 17:
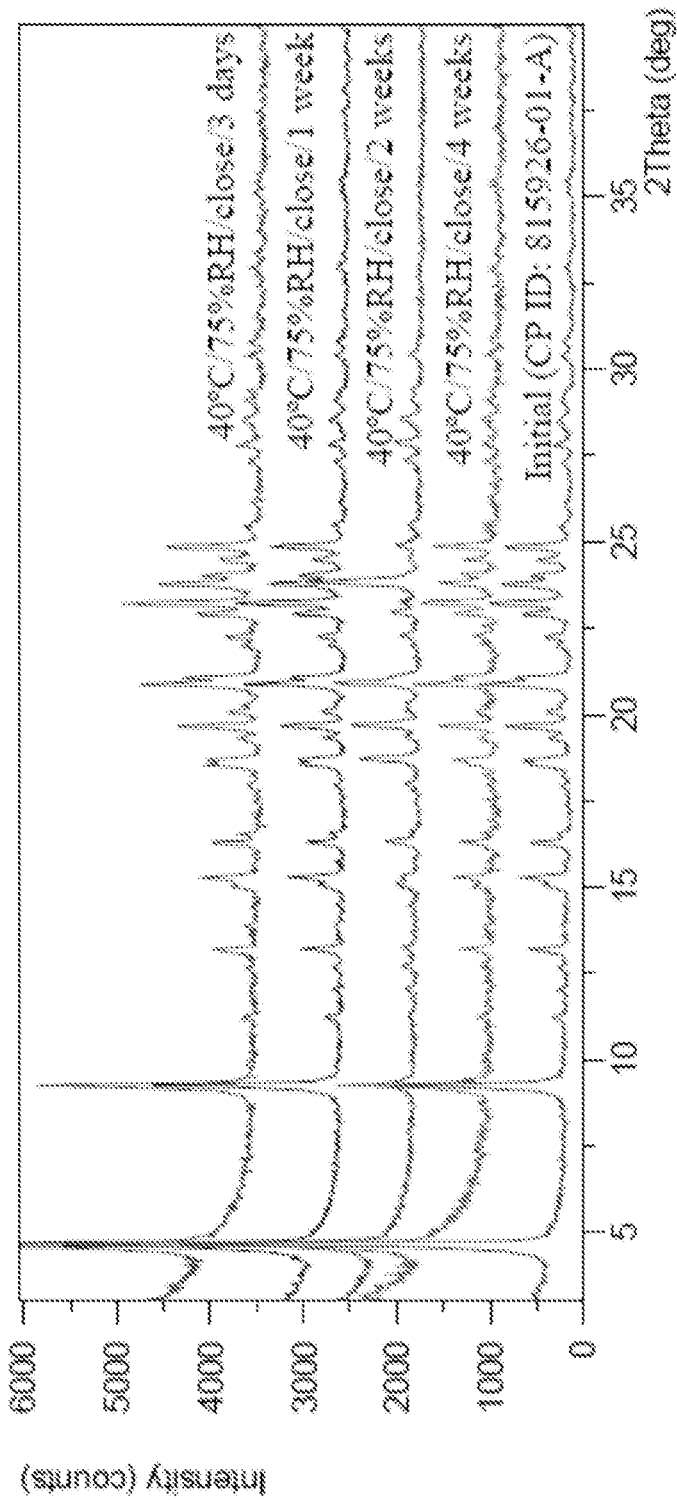
FIG. 17 shows XRPD overlay of Compound I after storage under condition of 40° C./75% RH/closed.

TGA/DSC results of Compound I starting material showed a weight loss of 0.45% up to 150° C. and a sharp endotherm at 68.2° C. (onset temperature) which was possibly due to melting. PLM result showed the starting material presented irregular morphology with agglomeration. The DVS plot (FIG. 12) showed 0.64% water uptake at 25° C./80% RH and 21.43% water uptake at 25° C./95% RH. No form change was observed after DVS test, as shown in FIG. 13. Sample information and characterization result was summarized in Table 4-2.

TABLE 4-2

Characterization summary of Compound I starting material

| Weight | Weight loss (%, up to 150° C.) | Endotherm (° C., onset) |
|---|---|---|
| 1.08 g | 0.45 | 68.2 |

Example 5

Single Crystal Growth

In total, 83 single crystal growth experiments were performed for Compound I by different methods, including slow evaporation, liquid vapor diffusion, slow cooling, heating-cooling and solvent-thermal synthesis. However only thin plate-like and overlayed crystal samples were obtained, which are too thin to perform the SCXRD characterization. Typical experiment procedures and detailed information are described.

Slow Evaporation

A total of 40 slow evaporation experiments were performed and some single crystal samples with thin plate-like morphology were obtained. Typical experiment procedures: Compound I starting material was weighed into a 3-mL glass vial, add selected solvent to the vial to dissolve the solid (accelerate the dissolution with vortex oscillator or ultrasonic apparatus). Filter the solution with PTFE filter (0.45 i) and disposable syringe to a 4-mL shell vial (44.6 mm×14.65 mm). In parts of experiments, small amount of Compound I starting material was added as crystal seeds. Subsequently, the shell vial was covered by the PE-Plug with one pinhole on it and placed at corresponding temperature for slow evaporation. After several days, samples were observed via PLM. Detailed experimental information is listed in Table 5-1, Table 5-2, Table 5-3, and Table 5-4.

TABLE 5-1

Slow evaporation single crystal growth experiments for Compound I

| Weight [a] (mg) | Solvent (v/v) | Volume (mL) | Temp. (° C.) | Result [c] |
|---|---|---|---|---|
| 3.0 | MeOH/ H$_2$O (1:1) | 0.5 | RT | Solid powder |
| 3.0 | EtOH/ n-Heptane (1:1) | 0.5 | RT | Clear solution |
| 3.1 | EtOH/ H$_2$O (1:2) | 0.5 | RT | Clear solution |
| 2.8 | IPA/ n-Heptane (1:1) | 0.5 | RT | Clear solution |
| 3.0 | IPA/ H$_2$O (1:4) | 0.5 | RT | Clear solution |
| 3.2 | EtOAc/ n-Heptane (1:1) | 0.5 | RT | Clear solution |
| 3.2 | IPAc/ n-Heptane (2:1) | 0.5 | RT | Plate-like crystal |
| 3.2 | ACN/ H$_2$O (1:2) | 0.5 | RT | Plate-like crystal |
| 3.2 | DCM/ n-Heptane (1:4) | 0.5 | RT | Plate-like crystal |
| 3.2 | CHCl$_3$/ n-Heptane (1:3) | 0.5 | RT | Block-like crystal |
| 3.1 | Acetone/ n-Heptane (1:2) | 0.5 | RT | Plate-like crystal |
| 3.1 | Acetone/ H$_2$O (1:3) | 0.5 | RT | Solid powder |
| 3.1 | MEK/ n-Heptane (1:2) | 0.5 | RT | Plate-like crystal |
| 2.9 | MEK/H$_2$O (1:3) | 0.5 | RT | Plate-like crystal |
| 2.8 | MTBE | 0.5 | RT | Plate-like crystal |
| 3.2 | THF/ n-Heptane (1:2) | 0.5 | RT | Plate-like crystal |
| 3.1 | THF/ H$_2$O (1:4) | 0.5 | RT | Solid powder |
| 3.1 | 1,4-Dioxane/ H$_2$O (1:4) | 0.5 | RT | Solid powder |
| 3.2 | DCM/ n-Hexane (1:4) | 0.5 | RT | Plate-like crystal |
| 3.1 | CHCl$_3$/ n-Hexane (1:3) | 0.5 | RT | Irregular crystal |
| 3.2 | Acetone/ n-Hexane (1:2) | 0.5 | RT | Plate-like crystal |

[a] Compound I;
b: A little amount of Compound I added as seed in this group of experiments;
[c] The experimental results were observed after 4 days of slow evaporation

TABLE 5-2

Slow evaporation single crystal growth experiments for Compound I

| Weight [a] (mg) | Solvent (v/v, mL) | Volume (mL) | Temp. (° C.) | Result [c] |
|---|---|---|---|---|
| 2.9 | ACN/H$_2$O (1:2) | 0.5 | RT | Flocculent crystal |
| 3.0 | DCM/n-Heptane (1:4) | 0.5 | RT | Plate-like crystal |
| 3.0 | CHCl$_3$/n-Heptane (1:3) | 0.5 | RT | Plate-like crystal |
| 3.0 | Acetone/n-Heptane (1:2) | 0.5 | RT | Plate-like crystal |
| 2.8 | MEK/H2O (1:3) | 0.5 | RT | Plate-like crystal |
| 3.0 | DCM/n-Hexane (1:4) | 0.5 | RT | Plate-like crystal |
| 3.1 | CHCl3/n-Hexane (1:3) | 0.5 | RT | Irregular crystal |

[a] Compound I;
[b] A little amount of Compound I added as seed in this group of experiments;
[c] The experimental results were observed after 3 days of slow evaporation

TABLE 5-3

Slow evaporation single crystal growth experiments for Compound I

| Weight [a](mg) | Solvent (v/v) | Volume (mL) | Temp. (° C.) | Result |
|---|---|---|---|---|
| 5.1 | CHCl$_3$/n-Heptane (1:3) | 0.6 | 5 | Plate-like & Needle-like crystal[c, d] |
| 4.9 | CHCl$_3$/n-Heptane (1:3) | 0.6 | 5 | Needle-like crystal[c, d] |
| 5.0 | MEK/H$_2$O (1:3) | 0.6 | 5 | Clear[c]; Solid powder[d] |
| 5.2 | MEK/H$_2$O (1:3) | 0.6 | 5 | Clear[c]; Solid powder[d] |
| 4.9 | CHCl$_3$/n-Hexane (1:3) | 0.6 | 5 | Needle-like crystal[c, d] |
| 4.8 | CHCl$_3$/n-Hexane (1:3) | 0.6 | 5 | Irregular crystal[c, d] |

[a]Compound I starting material;
[b]A little starting amount of Compound I added as seed in this batch of experiments;
[c]The experimental results were observed after 1 days of slow evaporation;
[d]The experimental results were observed after 4 days of slow evaporation

TABLE 5-4

Slow evaporation single crystal growth experiments for Compound I

| Weight [a](mg) | Solvent (v/v) | Volume (mL) | Temp. (° C.) | Result[c] |
|---|---|---|---|---|
| 4.1 | CHCl$_3$/n-Heptane (1:3) | 0.5 | RT | Plate-like crystals |
| 4.0 | CHCl$_3$/n-Heptane (1:3) | 0.5 | RT | Plate-like crystals |
| 3.8 | CHCl$_3$/n-Heptane (1:3) | 0.5 | RT | Plate-like crystals |
| 4.2 | CHCl$_3$/n-Hexane (1:3) | 0.5 | RT | Plate-like crystals |
| 4.2 | CHCl$_3$/n-Hexane (1:3) | 0.5 | RT | Irregular crystals |
| 3.9 | CHCl$_3$/n-Hexane (1:3) | 0.5 | RT | Plate-like crystals |

[a]Compound I starting material;
[b]Without addition of crystal seed in this group of experiments;
cThe experimental results were observed after 1 days of slow evaporation Slow Evaporation A total of 22 liquid vapor diffusion experiments were conducted and some single crystal samples with thin plate-like morphology were obtained.

Typical experiment procedures: Compound I starting material was weighed into a 3-ml glass vial, add selected solvent to the vial to dissolve the solid (dissolution could be accelerated by vortex oscillator or ultrasonic apparatus). Filtered the solution with PTFE filter (0.45 μm) and disposable syringe to a 4-mL shell vial (44.6 mm×14.65 mm). In part of experiments, very small amount of Compound I starting material was added as crystal seeds to induce crystallization. Subsequently, the shell vial was covered by the PE-Plug with one pinhole on it. The 4-ml shell vial was then put into a 20-ml glass vial containing 3.0 ml anti-solvent, sealed and stored at corresponding temperature for liquid vapor diffusion. After several days, samples were observed via PLM. Detailed experimental information is listed in Table 5-5, Table 5-6, and Table 5-7.

TABLE 5-5

Liquid vapor diffusion single crystal growth experiments for Compound I

| Weight [a](mg) | Solvent (v/v) | Volume (mL) | Anti-Solvent | Temp. (° C.) | Result[c] |
|---|---|---|---|---|---|
| 2.9 | 1,4-Dioxane/n-Heptane (1:2) | 0.5 | n-Heptane | RT | Gel |
| 2.9 | Toluene/n-Heptane (2:1) | 0.5 | | RT | Irregular crystal |
| 3.1 | 1,4-Dioxane/H$_2$O (1:4) | 0.5 | H$_2$O | RT | Solid powder |
| 3.2 | ACN/H$_2$O (1:1) | 0.5 | | RT | Clear solution |
| 3.0 | EtOH/n-Hexane (1:1) | 0.5 | n-Pentane | RT | Clear solution |
| 2.9 | IPA/n-Hexane (1:1) | 0.5 | | RT | Clear solution |
| 3.1 | EtOAc/n-Hexane (1:1) | 0.5 | | RT | Plate-like crystal |
| 2.8 | IPAc/n-Hexane (2:1) | 0.5 | | RT | Clear |
| 2.8 | MEK/n-Hexane (1:2) | 0.5 | | RT | Crystal particle |
| 3.2 | THF/n-Hexane (1:2) | 0.5 | | RT | Plate-like crystal |
| 2.8 | 1,4-Dioxane/n-Hexane (1:2) | 0.5 | | RT | Gel |
| 3.1 | Toluene/n-Hexane (2:1) | 0.5 | | RT | Plate-like crystal |
| 3.2 | 2-MeTHF/n-Hexane (1:2) | 0.5 | | RT | Plate-like crystal |
| 3.2 | MTBE | 0.5 | | RT | Plate-like crystal |
| 2.9 | Acetone/n-pentane (1:2) | 0.5 | | RT | Gel |
| 3.2 | CHCl$_3$/n-pentane (1:1) | 0.5 | | RT | Solid powder |

[a]Compound I starting material;
[b]A little amount of Compound I added as seed in this group of experiments;
[c]The experimental results were observed after 3 days of liquid vapor diffusion

TABLE 5-6

Liquid vapor diffusion single crystal growth experiments for Compound I

| Weight [a](mg) | Solvent (v/v) | Volume (mL) | Anti-Solvent | Temp. (° C.) | Result[c] |
|---|---|---|---|---|---|
| 5.0 | Toluene/n-Heptane (2:1) | 0.6 | n-Heptane | 5 | Plate-like & Needle-like crystal |
| 5.0 | | 0.6 | | 5 | Plate-like crystal |

[a]Compound I starting material;
[b]A little amount of Compound I added as seed in this batch of experiments;
[c]The experimental results were observed after 4 days of liquid vapor diffusion

TABLE 5-7

Liquid vapor diffusion single crystal growth experiments for Compound I

| Weight [a](mg) | Solvent (v/v, mL) | Volume (mL) | Anti-Solvent | Temp. (° C.) | Result[d] |
|---|---|---|---|---|---|
| 4.1 | Toluene/n-Heptane (2:1) | 0.5 | n-Heptane | RT | Irregular crystal |
| 4.0 | CHCl$_3$/n-Pentane (1:3) | 0.5 | n-Pentane | RT | Plate-like crystal |

TABLE 5-7-continued

Liquid vapor diffusion single crystal growth experiments for Compound I

| Weight [a] (mg) | Solvent (v/v, mL) | Volume (mL) | Anti-Solvent | Temp. (° C.) | Result[d] |
|---|---|---|---|---|---|
| 10.1 | H2O-sat'd EtOAc[c] | 0.5 | | RT | Clear |
| 10.0 | H2O-sat'd EtOAc[c] | 0.5 | | RT | Clear |

[a]Compound I starting material;
[b]Without addition of crystal seed in this batch of experiments;
[c]EtOAc was saturated with H2O;
[d]The experimental results were observed after 2 days of liquid vapor diffusion Slow Cooling A total of 6 slow cooling experiments were conducted and some single crystal samples with plate-like morphology were obtained.

Typical experiment procedures: Compound I starting material was weighed into a 3-ml glass vial with the addition of 0.5 mL selected solvent. After acceleration of the dissolution process by via vortex oscillator or ultrasonic apparatus, the suspension was then kept in a 50° C. oven for about 0.5 hrs. Then the hot solution was filtered into another 3-ml glass vial with PTFE filter (0.45 μm) and 2.0 ml disposable syringe (the PTFE filter, disposable syringe and 3-ml glass vial were preheated at 50° C.), added a little amount of starting material to the vial as crystal seeds. The vial was then sealed and pleased in a bio-chemical incubator for slow cooling (cooling program: 50° C.→5° C., 0.01° C./min).

TABLE 5-8

Slow cooling single crystal growth experiments for Compound I

| Weight [a] (mg) | Solvent (v/v) | Volume (ml) | Temp. (° C.) [b] | Result [c] |
|---|---|---|---|---|
| 5.1 | CHCl$_3$/n-Heptane (1:5) | 0.5 | 50→5 | Plate-like crystal |
| 4.9 | CHCl$_3$/n-Heptane (1:5) | 0.5 | 50→5 | Plate-like crystal |
| 4.9 | MEK/n-Heptane (1:3) | 0.5 | 50→5 | Plate-like crystal |
| 4.9 | MEK/H2O (1:5) | 0.5 | 50→5 | Solid powder |
| 5.2 | Toluene/n-Heptane (1:1) | 0.5 | 50→5 | Plate-like crystal |
| 5.2 | Toluene/n-Heptane (1:1) | 0.5 | 50→5 | Irregular crystal |

[a] Compound I starting material;
[b] Cooling program: 50° C.→5° C., 0.01° C./min;
[c] The experimental results were observed after 4 days of slow cooling (the end of cooling)

Heating-Cooling

A total of 9 heating-cooling experiments were conducted and some single crystal samples with plate-like morphology were obtained.

Typical experiment procedures: Compound I starting material was weighed into a 3-ml glass vial with addition of 0.5 mL selected solvent. After acceleration of the dissolution process by via vortex oscillator or ultrasonic apparatus, the suspension was then kept in a 50° C. oven for about 0.5 hrs. Then the hot solution was filtered into another 3-ml glass vial with PTFE filter (0.45 μm) and 2.0 ml disposable syringe (the PTFE filter, disposable syringe and 3-ml glass vial were preheated at 50° C.). Added a little amount of starting material to the vial as crystal seeds. The vial was then sealed and placed into a bio-chemical incubator for heating-cooling (heating-cooling program: 50° C.→>5° C., 0.05° C./min, 5 cycles).

TABLE 5-9

Heating-cooling single crystal growth experiments for Compound I

| Weight a (mg) | Solvent (v/v) | Volume (mL) | Tem. (° C.) b | Result c |
|---|---|---|---|---|
| 4.9 | CHCl3/n-Heptane (1:3) | 0.5 | 50→5 | Plate-like crystal |
| 5.1 | CHCl3/n-Heptane (1:3) | 0.5 | 50→5 | Plate-like crystal |
| 5.2 | CHCl3/n-Heptane (1:3) | 0.5 | 50→5 | Plate-like crystal |
| 4.9 | MEK/n-Heptane (1:3) | 0.5 | 50→5 | Plate-like crystal |
| 4.9 | MEK/n-Heptane (1:3) | 0.5 | 50→5 | Plate-like crystal |
| 4.9 | MEK/n-Heptane (1:3) | 0.5 | 50→5 | Plate-like crystal |
| 4.9 | Toluene/n-Heptane (1:1) | 0.5 | 50→5 | Plate-like crystal |
| 5.2 | Toluene/n-Heptane (1:1) | 0.5 | 50→5 | Plate-like crystal |

TABLE 5-9-continued

Heating-cooling single crystal growth experiments for Compound I

| Weight a (mg) | Solvent (v/v) | Volume (mL) | Tem. (° C.) b | Result c |
|---|---|---|---|---|
| 5.2 | Toluene/n-Heptane (1:1) | 0.5 | 50→5 | Plate-like crystal | a: Compound I starting material;
b: Cooling program: 50° C.→5° C. 0.05° C./min, 5 cycles;
c: The experimental results were observed after 4 days of slow cooling (the end of cooling)

Solvent-Thermal

A total of 6 solvent-thermal experiments were conducted and some single crystal samples with needle-like morphology were obtained. Typical experiment procedures: Compound I starting material was weighed into a 3-ml glass vial with addition of 0.4 mL selected solvent. Subsequently, the vial was then put into a hydrothermal reactor, sealed and placed in the oven for solvent-thermal experiments (temperature program: 25° C.→80° C.→25° C.).

TABLE 5-10

Solvent-thermal single crystal growth experiments for Compound I

| Weight $^a$ (mg) | Solvent (v/v) | Volume (mL) | Temp. (° C.) $^b$ | Result $^c$ |
|---|---|---|---|---|
| 15.0 | DCM/n-Heptane (1:3) | 0.4 | 25→80→25 | Plate-like crystal |
| 14.7 | DCM/n-Heptane (1:3) | 0.4 | 25→80→25 | Plate-like crystal |
| 14.9 | MTBE/n-Heptane (1:3) | 0.4 | 25→80→25 | Plate-like crystal |
| 14.9 | MTBE/n-Heptane (1:3) | 0.4 | 25→80→25 | Plate-like crystal |
| 14.9 | Acetone/n-Heptane (1:1) | 0.4 | 25→80→25 | Plate-like crystal |
| 15.0 | Acetone/n-Heptane (1:1) | 0.4 | 25→80→25 | Plate-like crystal |

$^a$ Compound I starting material;
$^b$ Temperature program: 25° C. → 80° C. → 25° C.;
$^c$ The experimental results were observed after 3 days of reaction (the end of cooling)

Example 6

Synthesis
Tosylation of Compound E to Form Compound B

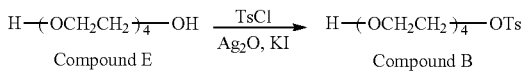

Compound E (99.8 g) was dissolved in dry DCM (2.0 L) and stirred at RT. After 5 min, potassium iodide (18.1 g), Ag$_2$O (179.8 g) and p-toluenesulfonyl chloride (108.5 g) were successively added to the solution. The reaction mixture was stirred vigorously overnight under N$_2$. After filtered through celite to remove the solids, the filtrate was concentrated, and purified by column chromatography (PE:EA=1:1 to PE:EA=1:2 to DCM:MeOH=25:1) to give a colorless oil Compound B (110.0 g, 61.4% yield). $^1$H NMR (FIG. 18) (400 MHz, CDCl3) δ 7.75 (d, J=8.0 Hz, 2H), 7.34 (d, J=8.0 Hz, 2H), 4.18-4.15 (m, 2H), 3.72-3.59 (m, 14H).

Condensation of Compound C and Compound D to Form Compound A

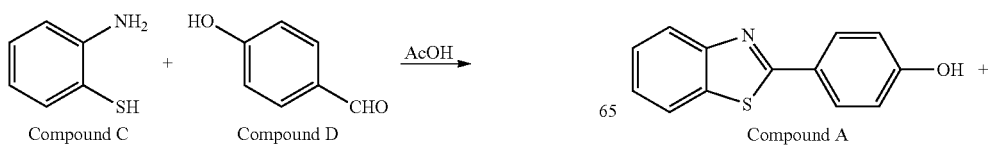

In a 3-L flask, Compound C (160.3 g) and Compound D (172.0 g) were dissolved in AcOH (1.5 L). The mixture was refluxed at 105° C. for 3.5 hrs. After being cooled to RT, the solution was poured into ice water, then filtered. The filtrate was concentrated and purified by recrystallization using EtOH (~1.4 L) to produce a dark grey solid Compound A (105.7 g, 36.3% yield). Procedure for recrystallization: The crude product was dissolved in 1.4 L EtOH forming a solution at 80° C. The solution was refluxed for a few minutes, and then cooled to RT slowly. The solid was collected and washed by EtOH. The solids were dried by vacuum at 50° C. for ~8 hrs. $^1$H NMR (FIG. 19) (400 MHz, CD$_3$OD) δ 7.95-7.91 (m, 4H), 7.51-7.47 (m, 1H), 7.40-7.36 (m, 1H), 6.93-6.91 (m, 2H).

Nucleophilic Addition of Compound B to Compound A to Form Compound I

-continued

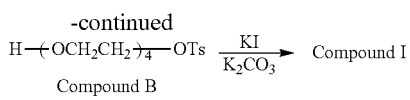

Compound B

Compound I was synthesized by condensation of Compound A and Compound B. First, condensation of Compound A and Compound B was attempted at small scale. In a flask was charged with Compound B (5.0 g), Compound A (3.3 g), $K_2CO_3$ (4.0 g), KI (0.2 g) and dry DMF (60 mL). The resulting mixture was heated at 80° C. overnight under $N_2$. After being cooled to RT, the product was extracted into EA by washing the aqueous layer with EA. The solvent of EA was removed under reduced pressure and the residue was purified by column chromatography (PE:EA=3:1) to give a white powder (4.3 g, 74.0% yield). Then, preparation of Compound I was scaled up to hundreds of grams. A flask was charged with Compound B (105.0 g), Compound A (68.5 g), $K_2CO_3$ (83.4 g), KI (5.0 g) and dry DMF (1.1 L). The resulting mixture was heated at 80° C. overnight under $N_2$. After being cooled to RT, the product was extracted into EA by washing the aqueous layer (~5 L $H_2O$) with EA (~7 L). The solvent of EA was removed under reduced pressure and the residue was purified by column chromatography (PE:EA=3:1) twice to give a white powder (~110.0 g). Two batches of Compound I were mixed into DCM forming a solution. The solvent of DCM was evaporated under reduced vacuum to give pure Compound I (103.0 g, 80.8% yield). Structure of Compound I was verified by $^1$H NMR (FIG. 20) and MS (FIG. 21). MS (m z): [M+H]+=404.1. $^1$H NMR (400 MHz, CDCl3) δ 8.18 (d, J=8.0 Hz, 1H), 8.11 (d, J=8.0 Hz, 2H), 7.82 (d, J=4.0 Hz, 1H), 7.49-7.45 (m, 1H), 7.38-7.34 (m, 1H), 7.01-6.98 (m, 2H), 4.18-4.15 (m, 2H), 3.84-3.81 (m, 2H), 3.67-3.61 (m, 10H), 3.55-3.53 (m, 2H). The HPLC purity of Compound I was also tested (HPLC, 230 nm and 254 nm UV). HPLC purity of Compound I was determined to be 99.8 area % when detected at 230 nm, and 99.7 area % by HPLC at 254 nm (Tables 6-1 and 6-2, respectively). The XRPD pattern of prepared Compound I conformed to Form I.

TABLE 6-1

HPLC purity of Compound I at 230 nm

| #Peak | RRT | Area % |
|---|---|---|
| 1 | 1.00 | 99.82 |
| 2 | 1.49 | 0.18 |

TABLE 6-2

HPLC purity of Compound I at 254 nm

| #Peak | RRT | Area % |
|---|---|---|
| 1 | 1.00 | 99.68 |
| 2 | 1.06 | 0.09 |
| 3 | 1.49 | 0.24 |

Sourcing of materials was in accordance with Table 6-3

TABLE 6-3

Sourcing of materials

| Abbreviation | Full name | CAS No. | Batch No. | Grade | Supplier |
|---|---|---|---|---|---|
| Compound C | 2-Aminobenzenethiol | 137-07-5 | FA060167 | 90.0% | Energy Chemical |
| Compound D | 4-Hydroxybenzaldehyde | 123-08-0 | Fl150115 | 99.0% | Energy Chemical |
| Compound E | Tetraethylene glycol | 112-60-7 | FI060015 | 98.0% | Energy Chemical |
| AcOH | Acetic acid | 64-19-7 | P1362124 | ≥99.5% | Greagent |
| TsCl | 4-toluene sulfonyl chloride | 98-59-9 | FK290198 | 99.0% | Energy Chemical |
| K2CO3 | Potassium carbonate | 584-08-7 | FH110107 | 99.0% | Energy Chemical |
| Ag2O | Silver oxide | 20667-12-3 | GD180335 | 99.0% | Energy Chemical |
| KI | Potassium iodide | 7681-11-0 | FI060019 | 98.0% | Energy Chemical |

Example 7

In Vitro Spinogenesis Using Benzothiazole Compounds

To demonstrate the efficacy of the compound for promoting spinogenesis, the effect of the compounds described herein on synaptic puncta and synapses of mouse cortical neurons is investigated.

Primary mouse cortical neurons are treated with 5 µM of test compound at DIV 15. As a control, primary mouse cortical neurons are treated with the vehicle only (10% DMSO, 90% phosphate buffered saline (PBS)). After 24 hours, the DIV 16 neurons are fixed, immunostained using the presynaptic vesicle protein synaptophysin (P38), counterstained with the nuclear dye DAPI (4',6-diamidino-2-phenylindole,), and counted. Immunolabeled neurons are imaged on a Leica confocal microscope. The numbers of P38-immunopositive puncta are analyzed using FIJI with the Squash plugin.

In a similar experiment, the primary mouse cortical neurons are treated with 1 µM of test compound at DIV 15, using the same DMSO/PBS buffer solution described above as the control vehicle. After 24 hours, the DIV 16 neurons are fixed, immunolabeled with synaptophysin, stained with DAPI, and counted as described above.

Example 8

In Silico Fascin Binding

In order to evaluate the ability of the compounds described herein to bind to fascin and thereby inhibit its ability to bundle actin fibrils, an in silico study is carried out using a test compound and available crystal structures of Human Fascin 1. Binding sites are identified on the surface of each fascin crystal structure, followed by virtual docking of test compound in each pocket to determine favorable binding conformations. See International Publication No. WO 2019/028164 (Feb. 7, 2019).

Analysis and Preparation of Fascin Crystal Structures

All available Fascin crystal structures are downloaded from the PDB and prepared for structure analysis (see, Sedeh, R. S. et al. *J Mol. Biol.* 400, 589-604 (2010); Chen, L. et al. *Nature* 464, 1062-1066 (2010); Jansen, S. et al. *J. Biol. Chem.* 286, 30087-30096 (2011); Yang, S. et al. *J. Biol. Chem.* 288, 274-284 (2013)). The structures are analyzed by eye and by standard automated protocols embedded in MolSoft's ICM-Pro software. Hydrogen atoms are added to the structures, and considerations are made regarding: correct orientation of Asn and Gln side-chains, ligand and protein charges, histidine orientation and protonation state, and any crystallographic quality flags, such as high b-factors or low occupancy.

Pocket Identification

MolSoft's ICMPocketFinder algorithm is used to identify potential ligand binding pockets and cavities in all the available Fascin crystal structures (see, An, J., et al. *Genome Inform. Int. Conf Genome Inform.* 15, 31-41 (2004); Kufareva, I., et al. *Nucleic Acids Res.* 40, D535-540 (2012)). First, pockets in the active chain A of crystal structure 3LLP are searched, as this structure is found to have the highest resolution (1.8 Å). Four "drug-like" pockets are identified as having properties suitable for binding small molecules.

Ligand Docking and Scoring

The head groups and head+tail of test compound are docked to each of four pockets using MolSoft's ICM-Docking software, Version 3.8-6a (Abagyan, R. & Totrov, M. *J Mol. Biol.* 235, 983-1002 (1994)). The docking scores to each of the pockets are determined. The lower the docking score the better the "compound-fascin binding pocket" interaction.

Pocket B, which is located at the Actin Binding Site 1, is contemplated to result in the lowest docking score. Binding pocket B is investigated further in the other fascin crystal structures. Using the docked head group as the anchor point, the tail group is then docked to produce the final energetically favorable compound poses.

The present disclosure is not to be limited in scope by the specific embodiments disclosed in the examples, which are intended to be illustrations of a few embodiments of the disclosure, nor is the disclosure to be limited by any embodiments that are functionally equivalent within the scope of this disclosure. Indeed, various modifications of the disclosure in addition to those shown and described herein will become apparent to those skilled in the art and are intended to fall within the scope of the appended claims. To this end, it should be noted that one or more hydrogen atoms or methyl groups can be omitted from the drawn structures consistent with accepted shorthand notation of such organic compounds, and that one skilled in the art of organic chemistry would readily appreciate their presence.

We claim:

1. Crystalline 2-(2-(2-(2-(4-(benzo[d]thiazol-2-yl)phenoxy)ethoxy)ethoxy)ethoxy)ethan-1-ol (Compound I Form I) characterized by an X-ray powder diffractogram comprising the following peaks (° 2θ±0.2° 2θ): 4.6, 20.8, and 23.7 as determined on a diffractometer using Cu-Kα radiation at a wavelength of 1.5406 Å.

2. Compound I Form I according to claim 1, wherein the diffractogram further comprises peaks (° 2θ±0.2° 2θ) at 9.2, 16.3, about 18.6, and 19.6.

3. Compound I Form I according to claim 1, characterized by a differential scanning calorimetry (DSC) curve that comprises an endotherm at 70° C. ±2° C.

4. A pharmaceutical composition comprising the crystalline form of claim 1 and one or more pharmaceutically acceptable carriers.

* * * * *

UNITED STATES PATENT AND TRADEMARK OFFICE
CERTIFICATE OF CORRECTION

Page 1 of 1

PATENT NO. : 12,486,287 B2
APPLICATION NO. : 17/426882
DATED : December 2, 2025
INVENTOR(S) : Stella T. Sarraf et al.

It is certified that error appears in the above-identified patent and that said Letters Patent is hereby corrected as shown below:

In the Claims

In Claim 2, Column 48, Lines 45-46, please replace "at 9.2, 16.3, about 18.6, and 19.6." with --at 9.2, 16.3, 18.6, and 19.6.--.

Signed and Sealed this
Twentieth Day of January, 2026

John A. Squires
*Director of the United States Patent and Trademark Office*